United States Patent
Xu et al.

(10) Patent No.: US 11,553,488 B2
(45) Date of Patent: Jan. 10, 2023

(54) PHYSICAL DOWNLINK SHARED CHANNEL REFERENCE SIGNAL PUNCTURING

(71) Applicant: QUALCOMM Incorporated, San Diego, CA (US)

(72) Inventors: Huilin Xu, San Diego, CA (US); Alexandros Manolakos, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 16/933,135

(22) Filed: Jul. 20, 2020

(65) Prior Publication Data
US 2021/0037525 A1    Feb. 4, 2021

(30) Foreign Application Priority Data

Aug. 1, 2019   (GR) .............................. 20190100330

(51) Int. Cl.
*H04L 12/28*       (2006.01)
*H04W 72/04*      (2009.01)
(Continued)

(52) U.S. Cl.
CPC ....... *H04W 72/0453* (2013.01); *H04W 72/02* (2013.01)

(58) Field of Classification Search
CPC ... H04L 1/0013; H04L 1/0067; H04L 1/0068; H04L 5/0005; H04W 72/0453
(Continued)

(56) References Cited

U.S. PATENT DOCUMENTS

2017/0223687 A1*   8/2017   Kuchibhotla ......... H04L 5/0007
2020/0068563 A1*   2/2020   Wu ....................... H04L 5/0082
(Continued)

OTHER PUBLICATIONS

ERICSSON: "Clarification on PDSCH Resource Mapping Around Scheduling PDCCH", 3GPP Draft, R1-1907111, 3GPP TSG-RAN WG1 Meeting 97, Clarification on PDSCH Resource Mapping Around Scheduling PDCCH, 3rd Generation Partnership Project (3GPP), Mobile Competence Centre, 650, Route Des Lucioles, F-06921 Sophia-A, vol. RAN WG1, No. Reno, USA, May 13, 2019-May 17, 2019, May 13, 2019 (May 13, 2019), XP051728557, 4 Pages, Retrieved from the Internet:URL:http://www.3gpp.org/ftp/Meetings%5F3GPP%5FSYNC/RAN1/Docs/R1%2D1907111%2Ezip [retrieved on May 13, 2019] Sections 1-2, Conclusion and Appendix.
(Continued)

*Primary Examiner* — John Pezzlo
(74) *Attorney, Agent, or Firm* — Holland & Hart LLP

(57) ABSTRACT

Methods, systems, and devices for wireless communications are described. According to one or more aspects, a user equipment (UE) may identify, for a set of time periods associated with a reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel. The UE may determine a remaining set of frequency resources from the first set of frequency resources based on the overlap, and a subset of frequency resources from the remaining set of frequency resources based on a reference signal processing configuration. The UE may then process the reference signal in the subset of frequency resources based on the reference signal processing configuration.

29 Claims, 19 Drawing Sheets

(51) Int. Cl.
   *H04W 72/02* (2009.01)
   *H04J 1/16* (2006.01)
(58) Field of Classification Search
   USPC .......................................... 370/252, 329, 430
   See application file for complete search history.

(56) References Cited

U.S. PATENT DOCUMENTS

| | | | | |
|---|---|---|---|---|
| 2020/0404699 | A1* | 12/2020 | Zheng | H04W 74/002 |
| 2022/0029761 | A1* | 1/2022 | Su | H04L 5/0091 |
| 2022/0124711 | A1* | 4/2022 | Zhou | H04W 28/26 |

OTHER PUBLICATIONS

HUAWEI., et al., "Discussion On Conditions of Rate Matching Pattern Overlapping with PDSCH DMRS Symbols", 3GPP Draft, R1-1907489, 3GPP TSG RAN WG1 Meeting #97, 3rd Generation Partnership Project (3GPP), Mobile Competence Centre, 650, Route Des Lucioles, F-06921, Sophia-Antipolis Cedex, France, vol. RAN WGI, No. Reno, USA, May 13, 2019-May 17, 2019, May 13, 2019 (May 13, 2019), XP051728922, 4 Pages, Retrieved from the Internet:URL:http://www.3gpp.org/ftp/Meetings%5F3GPP%5FSYNC/ RAN1/Docs/R1%2D1907489%2Ezip [retrieved on May 13, 2019] Sections 1-3.
International Search Report and Written Opinion—PCT/US2020/ 042929—ISA/EPO—dated Oct. 27, 2020.
Mediatek Inc: "Maintenance for Rate Matching", 3GPP Draft, R1-1903240, 3GPP TSG-RAN WG1 Meeting #96, Maintenance on Rate Matching, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 22, 2019 (2819-82-22), XP051600937, 2 Pages, Retrieved from the Internet:URL:http://www.3gpp.org/ftp/ tsg%5Fran/WG1%5FRL1/TSGR1%5F96/Docs/R1%2D1903240% 2Ezip [retrieved on Feb. 22, 2019] Sections 1-2.
Qualcomm Incorporated: "Rate Matching Aspects for NR DL and UL", 3GPP Draft, R1-1720695, 3GPP TSG RAN WG1 Meeting 91, Rate Matching Aspects for NR DL and UL, 3rd Generation Partnership Project (3GPP), Mobile Competence Centre, 650, Route Des Lucioles, F-06921 Sophia-Antipolis Cedex, France, vol. RAN WG1, No. Reno, NV, U.S.A, Nov. 27, 2017-Dec. 1, 2017, Nov. 18, 2017 (Nov. 10, 2017), XP051370156, pp. 1-4, Retrieved from the Internet:URL:http://www.3gpp.org/ftp/tsp%5Fran/WG1%5FRL1/ TSGR1%5F91/Docs/ [retrieved on Nov. 18, 2017] Sections 1-3.
Qualcomm Incorporated: "Remaining Issues on PDSCH Rate Matching in CORESET", 3GPP TSG RAN WG1 Meeting #9 2bis, 3GPP Draft; R1-1805250 Remaining Issues on PDSCH Rate Matching in CORESET, 3rd Generation Partnership Project (3GPP), Mobile Competence Centre, 650, Route Des Lucioles, F-06921 Sophia-Anti Polis Cedex, France, vol. RAN WG1, No. Sanya, China; Apr. 16, 2018-Apr. 20, 2018, Apr. 15, 2018 (Apr. 15, 2018), pp. 1-2, XP051427494, Retrieved from the Internet: URL: https://www. 3gpp.org/ftp/Meetings_3GPP_SYNC/RAN1/Docs/[retrieved on Apr. 15, 2018], Section 2.

* cited by examiner

Demodulation Reference Signal

Physical Downlink Shared Channel

Resources not available to Physical Downlink Shared Channel

|  | Demodulation Reference Signal |
|---|---|
|  | Physical Downlink Shared Channel |
|  | Resources not available to Physical Downlink Shared Channel |

PHYSICAL DOWNLINK SHARED CHANNEL REFERENCE SIGNAL PUNCTURING

CROSS REFERENCE

The present application for Patent claims the benefit of Greek Provisional Patent Application No. 20190100330 by Xu et al., entitled "PHYSICAL DOWNLINK SHARED CHANNEL REFERENCE SIGNAL PUNCTURING," filed Aug. 1, 2019, assigned to the assignee hereof, and expressly incorporated by reference in its entirety herein.

BACKGROUND

The following relates generally to wireless communications, and to physical downlink shared channel reference signal puncturing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems (e.g., NR systems), a UE may receive reference signals associated with downlink transmissions.

SUMMARY

The described techniques relate to improved methods, systems, devices, and apparatuses that support physical downlink shared channel reference signal puncturing. Generally, the described techniques provide for handling a collision between a reference signal, such as a demodulation reference signal associated with a physical downlink shared channel, and resource elements not allocated for the physical downlink shared channel. According to one or more aspects of the present disclosure, a user equipment (UE) may receive a physical downlink shared channel and a demodulation reference signal associated with the physical downlink shared channel. In some cases, the UE may identify an overlap between a first set of frequency resources allocated for the demodulation reference signal and a second set of frequency resources that are scheduled to puncture the first set of resources. The UE may determine that the second set of frequency resources are unavailable for scheduling on the physical downlink shared channel. Upon identifying the overlap between the first set of frequency resources and the second set of frequency resources, the UE may determine a remaining set of frequency resources from the first set of frequency resources for each symbol associated with the demodulation reference signal. In some examples, the UE may determine a subset of frequency resources based on a reference signal processing configuration, and the UE may process the subset of frequency resources in each symbol carrying the demodulation reference signal according to the reference signal processing configuration.

A method of wireless communication at a UE is described. The method may include receiving, from a base station, a reference signal associated with the physical downlink shared channel, identifying, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel, determining a remaining set of frequency resources from the first set of frequency resources for each time period of the set of time periods based on the overlap, determining a subset of frequency resources from the remaining set of frequency resources for each time period of the set of time periods based on a reference signal processing configuration, and processing the reference signal in the subset of frequency resources based on the reference signal processing configuration.

An apparatus for wireless communication at a UE is described. The apparatus may include a processor, memory coupled to the processor, and instructions stored in the memory. The instructions may be executable by the processor to cause the apparatus to receive, from a base station, a reference signal associated with the physical downlink shared channel, identify, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and process the reference signal in the subset of frequency resources based on the reference signal processing configuration.

Another apparatus for wireless communication at a UE is described. The apparatus may include means for receiving, from a base station, a reference signal associated with the physical downlink shared channel, identifying, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel, determining a remaining set of frequency resources from the first set of frequency resources for each time period of the set of time periods based on the overlap, determining a subset of frequency resources from the remaining set of frequency resources for each time period of the set of time periods based on a reference signal processing configuration, and processing the reference signal in the subset of frequency resources based on the reference signal processing configuration.

A non-transitory computer-readable medium storing code for wireless communication at a UE is described. The code may include instructions executable by a processor to receive, from a base station, a reference signal associated with the physical downlink shared channel, identify, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and process the reference signal in the subset of frequency resources based on the reference signal processing configuration.

In some examples of the method, apparatuses, and non-transitory computer-readable medium described herein, the reference signal processing configuration indicates that the subset of frequency resources may be identical for each time period of the set of time periods. Some examples of the method, apparatuses, and non-transitory computer-readable medium described herein may further include operations, features, means, or instructions for identifying, for a second set of time periods associated with the physical downlink shared channel, an overlap between a third set of frequency resources allocated for the physical downlink shared channel and the second set of frequency resources that may be scheduled to puncture the third set of frequency resources, and determining, a second subset of frequency resources from the third set of frequency resources for each time period of the second set of time periods based on the overlap between the third set of frequency resources and the second set of frequency resources, where the second subset of frequency resources includes frequency resources remaining in the third set of frequency resources after rate matching around the second set of frequency resources.

Some examples of the method, apparatuses, and non-transitory computer-readable medium described herein may further include operations, features, means, or instructions for identifying, from the remaining set of frequency resources, a largest common subset of frequency resources across all time periods of the set of time periods, and identifying a union of the second subset of frequency resources from the third set of frequency resources across all time periods of the set of time periods, where the reference signal processing configuration indicates that the largest common subset of frequency resources may be sufficiently large to decode the physical downlink shared channel in the union of the second subset of frequency resources from the third set of frequency resources.

In some examples of the method, apparatuses, and non-transitory computer-readable medium described herein, determining the subset of frequency resources from the remaining set of frequency resources may include operations, features, means, or instructions for discarding, from the subset of frequency resources, a resource element from the remaining set of frequency resources that overlaps with the second set of frequency resources. In some examples of the method, apparatuses, and non-transitory computer-readable medium described herein, determining the subset of frequency resources from the remaining set of frequency resources may include operations, features, means, or instructions for discarding, from the subset of frequency resources, a resource block from the remaining set of frequency resources that overlaps by at least one resource element with the second set of frequency resources.

In some examples of the method, apparatuses, and non-transitory computer-readable medium described herein, determining the subset of frequency resources from the remaining set of frequency resources may include operations, features, means, or instructions for including, in the subset of frequency resources, a resource block from the remaining set of frequency resources that contains at least one resource element that does not overlap by any resource element with the second set of frequency resources. In some examples of the method, apparatuses, and non-transitory computer-readable medium described herein, determining the subset of frequency resources from the remaining set of frequency resources may include operations, features, means, or instructions for discarding, from the subset of frequency resources, a precoding resource block group from the remaining set of frequency resources that overlaps by at least one resource element with the second set of frequency resources.

In some examples of the method, apparatuses, and non-transitory computer-readable medium described herein, determining the subset of frequency resources from the remaining set of frequency resources may include operations, features, means, or instructions for identifying that a precoding resource block group size for the first set of frequency resources may be configured as wideband, assuming that the precoding resource block group size may be configured as a default size that may be less than wideband, and discarding from the subset of frequency resources a precoding resource block group from the remaining set of frequency resources that overlaps by at least one resource element with the second set of frequency resources based on assuming that the precoding resource block group size may be configured as the default size.

In some examples of the method, apparatuses, and non-transitory computer-readable medium described herein, the assuming further may include operations, features, means, or instructions for assuming that the precoding resource block group size may be configured as the default size based on at least one of a radio resource control signal received from a base station, a capability associated with the UE, or a combination thereof. In some examples of the method, apparatuses, and non-transitory computer-readable medium described herein, the reference signal processing configuration indicates that the subset of frequency resources includes a largest common subset of frequency resources across all time periods of the set of time periods.

In some examples of the method, apparatuses, and non-transitory computer-readable medium described herein, a precoding resource block group size for the first set of frequency resources may be configured as wideband or the physical downlink shared channel may be configured with a first frequency domain resource allocation type, and where the second set of frequency resources includes resource element level rate matching resource. In some examples of the method, apparatuses, and non-transitory computer-readable medium described herein, determining the subset of frequency resources from the remaining set of frequency resources further may include operations, features, means, or instructions for discarding, from the subset of frequency resources, a resource block from the remaining set of frequency resources having a resource element that overlaps with the resource element level rate matching resource.

In some examples of the method, apparatuses, and non-transitory computer-readable medium described herein, the first set of frequency resources includes a first resource element in a set of resource elements associated with a time division orthogonal cover code or a frequency division orthogonal cover code, and where the second set of frequency resources includes a resource element level rate matching resource that overlaps with at least the first resource element in the set of resource elements. In some examples of the method, apparatuses, and non-transitory computer-readable medium described herein, determining the subset of frequency resources from the remaining set of frequency resources further may include operations, features, means, or instructions for discarding, from the subset of frequency resources, the set of resource elements.

In some examples of the method, apparatuses, and non-transitory computer-readable medium described herein, a precoding resource block group size for the first set of frequency resources may be configured as wideband or the physical downlink shared channel may be configured with a first frequency domain resource allocation type and where the reference signal processing configuration indicates that the subset of frequency resources includes a number of frequency segments of contiguous resource blocks that may be less than or equal to a threshold. In some examples of the method, apparatuses, and non-transitory computer-readable medium described herein, the number of frequency segments may be based on a largest common subset of frequency resources from the remaining set of frequency resources across all time periods of the set of time periods.

In some examples of the method, apparatuses, and non-transitory computer-readable medium described herein, the number of frequency segments may be based on the subset of frequency resources in each time period of the set of time periods. In some examples of the method, apparatuses, and non-transitory computer-readable medium described herein, the reference signal processing configuration indicates that a total number of frequency resources of the second set of frequency resources may be less than or equal to a threshold. In some examples of the method, apparatuses, and non-transitory computer-readable medium described herein, the total number of frequency resources of the second set of frequency resources corresponds to any time period of the set of time periods.

Some examples of the method, apparatuses, and non-transitory computer-readable medium described herein may further include operations, features, means, or instructions for identifying that a first time period of the set of time periods and a second time period of the set of time periods may be associated with a time division orthogonal cover code, and identifying, in the first time period and the second time period, a distinct number of frequency resources that may be scheduled to puncture the first set of resources allocated for the reference signal, where the total number of frequency resources of the second set of frequency resources may be based on the distinct number of frequency resources. Some examples of the method, apparatuses, and non-transitory computer-readable medium described herein may further include operations, features, means, or instructions for identifying, in the set of time periods, a distinct number of frequency resources that may be scheduled to puncture the first set of resources allocated for the reference signal, where the total number of frequency resources of the second set of frequency resources may be based on the distinct number of frequency resources.

In some examples of the method, apparatuses, and non-transitory computer-readable medium described herein, the reference signal processing configuration indicates that the set of time periods associated with the reference signal includes at least one of a set of time periods associated with the physical downlink shared channel in a slot, a set of time periods associated with multiple repetitions of the physical downlink shared channel in one or multiple slots scheduled by the same downlink control indicator, a set of time periods associated with multiple physical downlink shared channels scheduled by a multi-slot downlink control indicator, a set of time periods associated with multiple physical downlink shared channels in multiple slots semi-persistently scheduled and activated by the same downlink control indicator, or a combination thereof.

Some examples of the method, apparatuses, and non-transitory computer-readable medium described herein may further include operations, features, means, or instructions for phasing continuity of the reference signal associated with the physical downlink shared channel may be configured for a bundle of time periods of the set of time periods associated with the reference signal. In some examples of the method, apparatuses, and non-transitory computer-readable medium described herein, determining the subset of frequency resources from the remaining set of frequency resources further may include operations, features, means, or instructions for identifying a punctured time period in the set of time periods and a subset of time periods remaining in the set of time periods after the punctured time period, and bundling the subset of time periods based on the reference signal processing configuration, where the reference signal processing configuration indicates that bundling may be disabled in the punctured time period.

In some examples of the method, apparatuses, and non-transitory computer-readable medium described herein, determining the subset of frequency resources from the remaining set of frequency resources further may include operations, features, means, or instructions for identifying a punctured time period in the set of time periods, and refraining from bundling the set of time periods based on the reference signal processing configuration. In some examples of the method, apparatuses, and non-transitory computer-readable medium described herein, the physical downlink shared channel includes a broadcast physical downlink shared channel or a unicast physical downlink shared channel.

In some examples of the method, apparatuses, and non-transitory computer-readable medium described herein, the broadcast physical downlink shared channel may be scheduled with at least one of a system information radio network temporary identifier, a random access radio network temporary identifier, a paging radio network temporary identifier, a temporary cell radio network temporary identifier, or a combination thereof. In some examples of the method, apparatuses, and non-transitory computer-readable medium described herein, the system information radio network temporary identifier includes a system information indicator in a downlink control indicator being set to a fixed value. In some examples of the method, apparatuses, and non-transitory computer-readable medium described herein, the unicast physical downlink shared channel may be scheduled with at least one of a physical downlink control channel including a cyclic redundancy check scrambled by one or more identifiers.

In some examples of the method, apparatuses, and non-transitory computer-readable medium described herein, the one or more identifiers include at least one of a cell radio network temporary identifier, a modulation coding scheme radio network temporary identifier, a configured scheduling radio network temporary identifier, a physical downlink shared channel with semi-persistent scheduling or a combination thereof. Some examples of the method, apparatuses, and non-transitory computer-readable medium described herein may further include operations, features, means, or instructions for receiving, from a base station, a signal indicating the reference signal processing configuration.

In some examples of the method, apparatuses, and non-transitory computer-readable medium described herein, the second set of frequency resources includes a synchronization signal block resource or a rate matching resource or both. In some examples of the method, apparatuses, and non-transitory computer-readable medium described herein, the set of time periods associated with the reference signal include a set of symbols. In some examples of the method, apparatuses, and non-transitory computer-readable medium described herein, the reference signal includes a demodulation reference signal.

A method of wireless communication at a base station is described. The method may include transmitting, to a UE a reference signal associated with the physical downlink shared channel, identifying, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel, determining a remaining set of frequency resources from the first set of frequency resources for each time period of the set of time periods based on the overlap, determining a subset of frequency resources from the remaining set of frequency resources for each time period of the set of time periods based on a reference signal processing configuration, and scheduling the second set of frequency resources based on the reference signal processing configuration.

An apparatus for wireless communication at a base station is described. The apparatus may include a processor, memory coupled to the processor, and instructions stored in the memory. The instructions may be executable by the processor to cause the apparatus to transmit, to a UE, a reference signal associated with the physical downlink shared channel, identify, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and schedule the second set of frequency resources based on the reference signal processing configuration.

Another apparatus for wireless communication at a base station is described. The apparatus may include means for transmitting, to a UE, a reference signal associated with the physical downlink shared channel, identifying, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel, determining a remaining set of frequency resources from the first set of frequency resources for each time period of the set of time periods based on the overlap, determining a subset of frequency resources from the remaining set of frequency resources for each time period of the set of time periods based on a reference signal processing configuration, and scheduling the second set of frequency resources based on the reference signal processing configuration.

A non-transitory computer-readable medium storing code for wireless communication at a base station is described. The code may include instructions executable by a processor to transmit, to a UE, a reference signal associated with the physical downlink shared channel, identify, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and schedule the second set of frequency resources based on the reference signal processing configuration.

Some examples of the method, apparatuses, and non-transitory computer-readable medium described herein may further include operations, features, means, or instructions for transmitting, to a UE, a signal indicating the reference signal processing configuration. In some examples of the method, apparatuses, and non-transitory computer-readable medium described herein, the reference signal processing configuration indicates that the subset of frequency resources may be identical for each time period of the set of time periods. Some examples of the method, apparatuses, and non-transitory computer-readable medium described herein may further include operations, features, means, or instructions for identifying, for a second set of time periods associated with the physical downlink shared channel, an overlap between a third set of frequency resources allocated for the physical downlink shared channel and the second set of frequency resources that may be scheduled to puncture the third set of frequency resources, and determining, a second subset of frequency resources from the third set of frequency resources for each time period of the second set of time periods based on the overlap between the third set of frequency resources and the second set of frequency resources, where the second subset of frequency resources includes frequency resources remaining in the third set of frequency resources after rate matching around the second set of frequency resources.

Some examples of the method, apparatuses, and non-transitory computer-readable medium described herein may further include operations, features, means, or instructions for identifying, from the remaining set of frequency resources, a largest common subset of frequency resources across all time periods of the set of time periods, and identifying a union of the second subset of frequency resources from the third set of frequency resources across all time periods of the set of time periods, where the reference signal processing configuration indicates that the largest common subset of frequency resources may be sufficiently large to decode the physical downlink shared channel in the union of the second subset of frequency resources from the third set of frequency resources. In some examples of the method, apparatuses, and non-transitory computer-readable medium described herein, determining the subset of frequency resources from the remaining set of frequency resources may include operations, features, means, or instructions for identifying that a precoding resource block group size for the first set of frequency resources may be configured as wideband, and transmitting, to a UE, a radio resource control signal indicating that the precoding resource block group size may be configured as a default size that may be less than wideband.

In some examples of the method, apparatuses, and non-transitory computer-readable medium described herein, the reference signal processing configuration indicates that the subset of frequency resources includes a largest common subset of frequency resources across all time periods of the set of time periods. In some examples of the method, apparatuses, and non-transitory computer-readable medium described herein, a precoding resource block group size for the first set of frequency resources may be configured as wideband or the physical downlink shared channel may be configured with a first frequency domain resource allocation type, and where the second set of frequency resources includes resource element level rate matching resource.

In some examples of the method, apparatuses, and non-transitory computer-readable medium described herein, the first set of frequency resources includes a first resource element in a set of resource elements associated with a time division orthogonal cover code or a frequency division orthogonal cover code, and where the second set of frequency resources includes a resource element level rate matching resource that overlaps with at least the first resource element in the set of resource elements. In some examples of the method, apparatuses, and non-transitory computer-readable medium described herein, a precoding resource block group size for the first set of frequency resources may be configured as wideband or the physical downlink shared channel may be configured with a first frequency domain resource allocation type and where the reference signal processing configuration indicates that the subset of frequency resources includes a number of frequency segments of contiguous resource blocks that may be less than or equal to a threshold.

In some examples of the method, apparatuses, and non-transitory computer-readable medium described herein, the number of frequency segments may be based on a largest common subset of frequency resources from the remaining set of frequency resources across all time periods of the set of time periods. In some examples of the method, apparatuses, and non-transitory computer-readable medium described herein, the number of frequency segments may be based on the subset of frequency resources in each time period of the set of time periods.

In some examples of the method, apparatuses, and non-transitory computer-readable medium described herein, the reference signal processing configuration indicates that a total number of frequency resources of the second set of frequency resources may be less than or equal to a threshold. In some examples of the method, apparatuses, and non-transitory computer-readable medium described herein, the total number of frequency resources of the second set of frequency resources corresponds to any time period of the set of time periods.

In some examples of the method, apparatuses, and non-transitory computer-readable medium described herein, the reference signal processing configuration indicates that the set of time periods associated with the reference signal includes at least one of a set of time periods associated with the physical downlink shared channel in a slot, a set of time periods associated with multiple repetitions of the physical downlink shared channel in one or multiple slots scheduled by the same downlink control indicator, a set of time periods associated with multiple physical downlink shared channels scheduled by a multi-slot downlink control indicator, a set of time periods associated with multiple physical downlink shared channels in multiple slots semi-persistently scheduled and activated by the same downlink control indicator, or a combination thereof.

Some examples of the method, apparatuses, and non-transitory computer-readable medium described herein may further include operations, features, means, or instructions for configuring phase continuity of the reference signal associated with the physical downlink shared channel for a bundle of time periods of the set of time periods associated with the reference signal. In some examples of the method, apparatuses, and non-transitory computer-readable medium described herein, the physical downlink shared channel includes a broadcast physical downlink shared channel or a unicast physical downlink shared channel.

In some examples of the method, apparatuses, and non-transitory computer-readable medium described herein, the broadcast physical downlink shared channel may be scheduled with at least one of a system information radio network temporary identifier, a random access radio network temporary identifier, a paging radio network temporary identifier, a temporary cell radio network temporary identifier, or a combination thereof. In some examples of the method, apparatuses, and non-transitory computer-readable medium described herein, the system information radio network temporary identifier includes a system information indicator in a downlink control indicator being set to a fixed value.

In some examples of the method, apparatuses, and non-transitory computer-readable medium described herein, the unicast physical downlink shared channel may be scheduled with at least one of a physical downlink control channel including a cyclic redundancy check scrambled by one or more identifiers. In some examples of the method, apparatuses, and non-transitory computer-readable medium described herein, the one or more identifiers include at least one of a cell radio network temporary identifier, a modulation coding scheme radio network temporary identifier, a configured scheduling radio network temporary identifier, a physical downlink shared channel with semi-persistent scheduling or a combination thereof.

In some examples of the method, apparatuses, and non-transitory computer-readable medium described herein, the second set of frequency resources includes a synchronization signal block resource or a rate matching resource or both. In some examples of the method, apparatuses, and non-transitory computer-readable medium described herein, the set of time periods associated with the reference signal include a set of symbols. In some examples of the method, apparatuses, and non-transitory computer-readable medium described herein, the reference signal includes a demodulation reference signal

DETAILED DESCRIPTION

Figure 1:
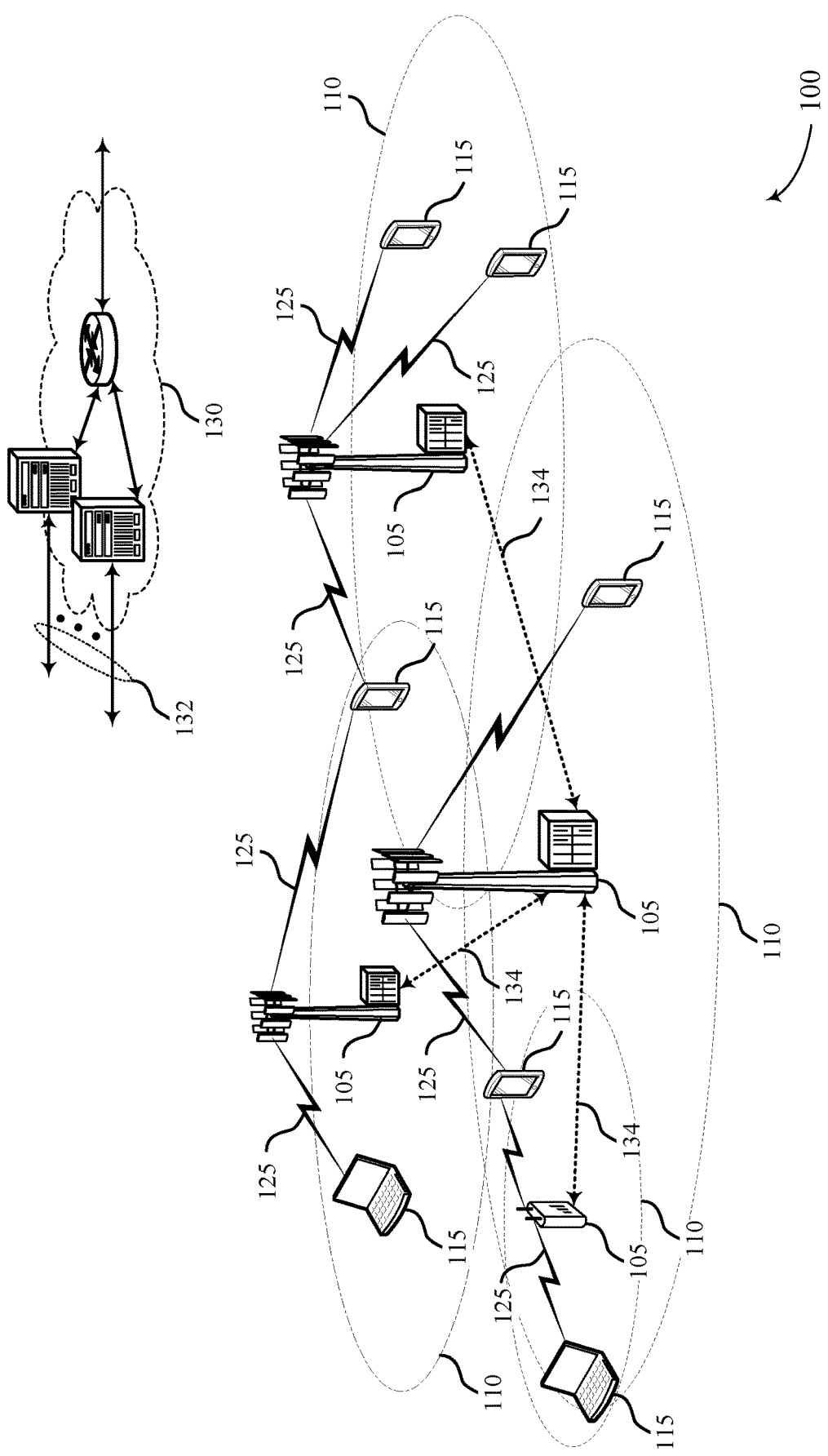
FIG. 1 illustrates an example of a wireless communications system that supports physical downlink shared channel reference signal puncturing in accordance with aspects of the present disclosure.

A user equipment (UE) in a wireless communications system, such as a New Radio (NR) system or a Long Term Evolution (LTE) system, may support techniques for puncturing a downlink reference signal with other types of signals such as synchronization signals and rate matching resources. In some examples, a UE may be configured to demodulate a physical downlink shared channel using a demodulation reference signal. In such cases a demodulation reference signal is transmitted in physical resources allocated to the physical downlink shared channel. A frequency resource allocation for the demodulation reference signal may include the same type of resources as a frequency resource allocation for the physical downlink shared channel. Some wireless communications systems may not be configured to handle the case where the demodulation reference signal partially overlaps with resource elements not allocated for the physical downlink shared channel. As such, the network may be restricted from scheduling a physical downlink shared channel where the corresponding demodulation reference signal would collide, even partially, with resource elements that are not available for the physical downlink shared channel.

According to one or more aspects of the present disclosure, a UE may be configured to handle a collision between a demodulation reference signal associated with a physical downlink shared channel and resource elements not allocated for the physical downlink shared channel. In some examples, the resource elements not allocated for the physical downlink shared channel may include synchronization signal block resources or rate matching resources, or both. In some cases, the UE may handle a collision between a demodulation reference signal and resource elements not allocated for the physical downlink shared channel according to a reference signal processing configuration. As explained in more detail below, the reference signal processing configuration may support puncturing the demodulation reference signal while limiting the processing complexity of doing so at the UE. In one example, a base station may transmit the reference signal processing configuration to the UE. For example, the reference signal processing configuration may indicate that the UE is not configured to process the overlapped demodulation reference signal resource elements. According to one or more aspects of the present disclosure, a UE may not assume that the base station has transmitted the colliding demodulation reference signal resource elements.

According to one or more aspects, a UE may receive a physical downlink shared channel and a demodulation reference signal associated with the physical downlink shared channel. In some cases, the UE may identify a set of time periods associated with a physical downlink shared channel demodulation reference signal. For example, the UE may identify a set of symbols over which the demodulation reference signal is received. In some cases, the UE may identify an overlap between a first set of frequency resources allocated for the demodulation reference signal and a second set of frequency resources that are scheduled to puncture the first set of resources. The UE may determine that the second set of frequency resources are unavailable for scheduling on the physical downlink shared channel. Upon identifying the overlap between the first set of frequency resources and the second set of frequency resources, the UE may determine a remaining set of frequency resources from the first set of frequency resources for each symbol associated with the demodulation reference signal. Additionally or alternatively, the UE may determine a subset of frequency resources from the remaining set of frequency resources for each symbol. According to one or more aspects of the present disclosure, the UE may determine the subset of frequency resources based on a reference signal processing configuration. According to one or more aspects, the base station may transmit the reference signal processing configuration to the UE. Alternatively, the UE may be preconfigured according to the reference signal processing configuration. In some examples, the reference signal processing configuration may include one or more rules to limit an increase in implementation complexity while processing the puncturing of the demodulation reference signal associated with a physical downlink shared channel. In some examples, the UE may process the remaining set of frequency resources in each symbol carrying the demodulation reference signal according to the reference signal processing configuration.

Aspects of the disclosure are initially described in the context of a wireless communications system. Aspects of the disclosure are further illustrated by and described with reference to apparatus diagrams, system diagrams, and flowcharts that relate to physical downlink shared channel reference signal puncturing.

FIG. 1 illustrates an example of a wireless communications system 100 that supports physical downlink shared channel reference signal puncturing in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to one or more aspects of the present disclosure, the UE 115 may receive a physical downlink shared channel and a demodulation reference signal associated with the physical downlink shared channel. In some cases, the UE 115 may identify a set of symbols associated with the demodulation reference signal and a set of symbols associated with the physical downlink shared channel. For example, the UE 115 may identify a set of symbols over which the demodulation reference signal and the physical downlink shared channel transmission are received. In some cases, the UE 115 may identify an overlap between a first set of frequency resources allocated for the demodulation reference signal and a second set of frequency resources that are scheduled to puncture the first set of resources. The UE 115 may determine that the second set of frequency resources are unavailable for scheduling on the physical downlink shared channel (e.g., the second set of frequency resources may include synchronization signal block resources or rate matching resources which are typically not available for scheduling on the physical downlink shared channel). Upon identifying the overlap between the first set of frequency resources and the second set of frequency resources, the UE may determine a remaining set of frequency resources from the first set of frequency resources for each symbol associated with the demodulation reference signal. Additionally or alternatively, the UE 115 may determine the subset of frequency resources based on a reference signal processing configuration, and the UE 115 may process the remaining set of frequency resources in each symbol carrying the demodulation reference signal according to the reference signal processing configuration.

Figure 2:
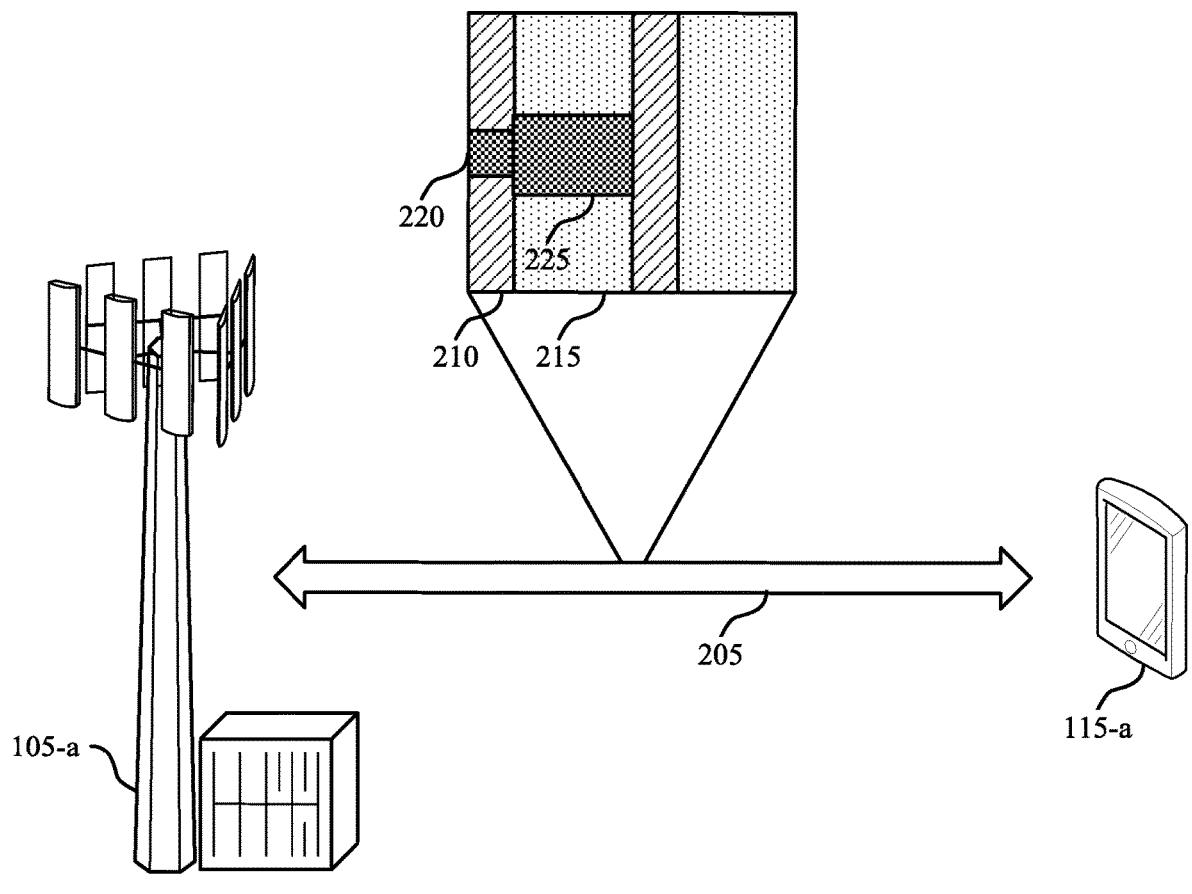
FIG. 2 illustrates an example of a wireless communications system that supports physical downlink shared channel reference signal puncturing in accordance with aspects of the present disclosure.
Figure 2:
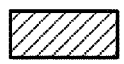
Figure 2:
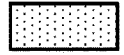
Figure 2:
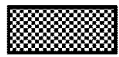

FIG. 2 illustrates an example of a wireless communications system 200 that supports physical downlink shared channel reference signal puncturing in accordance with aspects of the present disclosure. In some examples, the wireless communications system 200 may implement aspects of wireless communications system 100. For instance, the wireless communications system 200 may include UE 115-*a* and base station 105-*a*. The base station 105-*a* described in FIG. 2 may be an example of a base station 105 described with reference to FIG. 1. In some examples, base station 105-*a* may be referred to as a network device or a next generation NodeB (gNB). UE 115-*a* may be an example of a UE 115 described with reference to FIG. 1. Base station 105-*a* may be an example of a serving base station 105 for UE 115-*a*.

The wireless communications system 200 may illustrate operations of and communications between the base stations 105 and the UEs 115 that support techniques for puncturing a downlink demodulation reference signal. In some wireless communications systems, a physical downlink shared channel demodulation reference signal is a type of physical layer signal which functions as a reference signal for decoding the physical downlink shared channel. Specifically, in 5G systems (or NR systems), the demodulation reference signal is used to decode a physical downlink shared channel demodulation due to an absence of a cell-specific reference signal. In some wireless communications systems, a physical downlink shared channel demodulation reference signal is transmitted in physical resources allocated to the physical downlink shared channel. In some cases, a frequency resource allocation for the demodulation reference signal includes the same type of resources as a frequency resource allocation for the physical downlink shared channel. In some examples, the resource elements for the demodulation reference signal may be within the common resource blocks allocated for physical downlink shared channel transmission. In some cases, a UE (such as UE 115-*a*) may not be configured to handle the case where the demodulation reference signal partially overlaps with resource elements not allocated for (e.g., not available to) the physical downlink shared channel.

Additionally, in some wireless communications systems, a base station (such as base station 105-*a*) may not configure a physical downlink shared channel where the associated demodulation reference signal would collide, even partially, with one or more resource elements not available for transmitting the physical downlink shared channel. In such cases, a UE may not be expected to handle the case where resource elements associated with a physical downlink shared channel demodulation reference signal are overlapping, even partially, with one or more resource elements not available to the physical downlink shared channel. In such cases, the resource elements that are not available to the physical downlink shared channel may be described as a set of resources that are unavailable for scheduling on the physical downlink shared channel. For example, the unavailable resource elements may at least include a synchronization signal block resource or a rate matching resource or both. In some cases, the synchronization signal block resource and a physical broadcast channel block resource occupy 20 resource blocks. In some cases, the rate matching resource may be a resource block level resource, or a resource element level resource, or both. In some examples, if a resource block level resource is configured by a base station, then the UE may be configured to rate match a physical downlink shared channel around complete resource blocks. In some examples, if a resource element level resource is configured by a base station, then the UE may be configured to rate match a physical downlink shared channel around one or more resource elements. Thus, in some wireless communications systems, although some frequency resources may be available for synchronization signal block, those resources may be restricted from overlapping with a demodulation reference signal symbol. In some cases, the frequency allocation for one or more demodulation reference signal resource elements may be specified by a physical downlink shared channel frequency allocation pattern, but the demodulation reference signal symbol does not overlap with any synchronization signal block resource or rate matching resource.

In some existing wireless communications systems, a UE may receive a physical downlink shared channel scheduled with a system information radio network temporary identifier and the system information indicator in a downlink control indicator set to 1, a random access radio network temporary identifier, a paging radio network temporary identifier or a temporary cell radio network temporary identifier. In such cases, the UE may assume synchronization signal block or physical broadcast channel block transmission according to ssb-PositionsInBurst. If the physical downlink shared channel resource allocation overlaps with physical resource blocks including the synchronization signal block or physical broadcast channel block transmission resources, the UE may assume that the physical resource blocks containing the synchronization signal block or physical broadcast channel block transmission resources are not available for physical downlink shared channel resource allocation in the OFDM symbols where the synchronization signal block or physical broadcast channel block is transmitted. According to another aspect, a UE may receive a physical downlink shared channel scheduled by a physical downlink control channel with a cyclic redundancy check scrambled by cell radio network temporary identifier, modulation coding scheme cell radio network temporary identifier, configured scheduling radio network temporary identifier, or physical downlink shared channel with semi-persistent scheduling. In such an example, the resource elements corresponding to the configured or dynamically indicated resources are not available for a physical downlink shared channel. Further the UE may assume synchronization signal block or physical broadcast channel block transmission according to ssb-PositionsInBurst if the physical downlink shared channel resource allocation overlaps with physical resource blocks containing the synchronization signal block or physical broadcast channel block transmission resources, the UE may assume that the physical resource blocks containing the synchronization signal block or physical broadcast channel block transmission resources are not available for physical downlink shared channel resource allocation in the OFDM symbols where the synchronization signal block or physical broadcast channel block is transmitted. For example, in a case for unicast physical downlink shared channel, the physical downlink shared channel may be rate matched around the available resources. Thus, according to some wireless communications systems, physical downlink shared channel demodulation reference signal puncturing by the synchronization signal block resources or rate matching resources may be restricted for a physical downlink shared channel.

According to one or more aspects of the existing wireless communications systems, although the frequency allocation for a demodulation reference signal may follow a physical downlink shared channel frequency allocation pattern, the frequency resources allocated for the demodulation reference signal may be restricted from colliding with synchronization signal block resources or rate matching symbols (e.g., resources). Such a restriction may potentially result in inefficient frequency bandwidth resource allocation if a resource block group is large. In some cases, a type 0 frequency resource allocation may indicate a bitmap based frequency resource allocation. In a type 0 frequency resource allocation, each bit may correspond to a resource block group. In some cases, a resource block group size may be based on bandwidth part size. If one resource block is not available (e.g., if one resource block collides with synchronization signal block resources or rate matching resources), then the total resource block group is not available for physical downlink shared channel resource allocation. In one example, a resource block group size may be 16. If one resource block collides with synchronization signal block resources or rate matching resources, then the remaining 15 resource blocks are not available for resource allocation. In another example, for type 1 physical downlink shared channel frequency domain resource allocation, a demodulation reference signal and the associated physical downlink shared channel may not be allocated in full bandwidth in a symbol that overlaps with the synchronization signal block resources or rate matching resources, or both. In some cases, the physical downlink shared channel frequency domain resource allocation may be based on resource block group size (e.g., type 0), where each bit in a resource allocation bitmap indicates whether a resource block group is allocated to the physical downlink shared channel or not. In some cases, the physical downlink shared channel frequency domain resource allocation may be based on contiguous resource block allocation (e.g., type 1), where a starting resource block and a number of allocated resource blocks are provided until the presence of a synchronization signal block within the resource block group.

One or more aspects of the present disclosure allows for physical downlink shared channel demodulation reference signal collision with synchronization signal block resources or rate matching resources, or both. In some cases, the colliding physical downlink shared channel demodulation reference signal resource may be punctured by a UE (such as UE 115-*a*). That is, the UE 115-*a* may not be required to process the colliding physical downlink shared channel demodulation reference signal resource elements. According to one or more aspects of the present disclosure, the UE 115-*a* may not assume that the base station 105-*a* has transmitted the colliding physical downlink shared channel demodulation reference signal resource elements. The present disclosure additionally provides for techniques to limit an increase in implementation complexity due to the demodulation reference signal puncturing. The techniques for limiting the increase in implementation complexity may include the processing of a reference signal processing configuration and are described in more detail with respect to FIGS. 3 through 7.

As depicted in the example of FIG. 2, a base station 105-*a* and a UE 115-*a* may be communicating using communication link 205. In some examples, the UE 115-*a* may receive a physical downlink shared channel 215 and a demodulation reference signal 210 associated with the physical downlink shared channel 215. In some cases, the UE 115-*a* may use the demodulation reference signal 210 to demodulate the physical downlink shared channel 215. In some examples, the UE 115-*a* may receive a reference signal associated with the physical downlink shared channel and may identify, for a set of time periods associated with a physical downlink shared channel demodulation reference signal, an overlap between a first set of frequency resources allocated for the demodulation reference signal 210 and a second set of frequency resources 220 that are scheduled to puncture the first set of resources and that are unavailable for scheduling on the physical downlink shared channel. Although FIG. 2 depicts that a single demodulation reference signal 210 is overlapped with the second set of frequency resources 220 (or puncturing resources), it may be understood that multiple demodulation reference signals may be overlapped with puncturing resources (such as synchronization signal block resources or rate matching resources or both). Additionally, the UE 115-*a* may identify an overlap between a set of frequency resources allocated for the physical downlink shared channel 215 and a set of frequency resources 225 that are unavailable for scheduling on the physical downlink shared channel.

Upon identifying the overlap between the first set of frequency resources allocated for the demodulation reference signal 210 and the second set of puncturing frequency resources 220, the UE 115-*a* may determine a remaining set of frequency resources from the first set of frequency resources for each time period of the set of time periods. That is, the UE 115-a may determine a remaining set of frequency resources in each demodulation reference signal 210 symbol. In some cases, the UE 115-a may determine a subset of frequency resources from the remaining set of frequency resources for each time period of the set of time periods based on a reference signal processing configuration. According to one or more aspects, the base station 105-a may transmit the reference signal processing configuration to the UE 115-a. Additionally or alternatively, the UE 115-a may be preconfigured according to the reference signal processing configuration (e.g., the UE 115-a may have the reference signal processing configuration preconfigured in hardware and/or software). In some examples, the reference signal processing configuration may include one or more rules to limit an increase in implementation complexity while processing a physical downlink shared channel demodulation reference signal puncturing. In some examples, the UE 115-a may process the demodulation reference signal in the subset of frequency resources based on the reference signal processing configuration. For example, the UE 115-a may process a remaining set of frequency resources in each demodulation reference signal based on the reference signal processing configuration.

Figure 3:
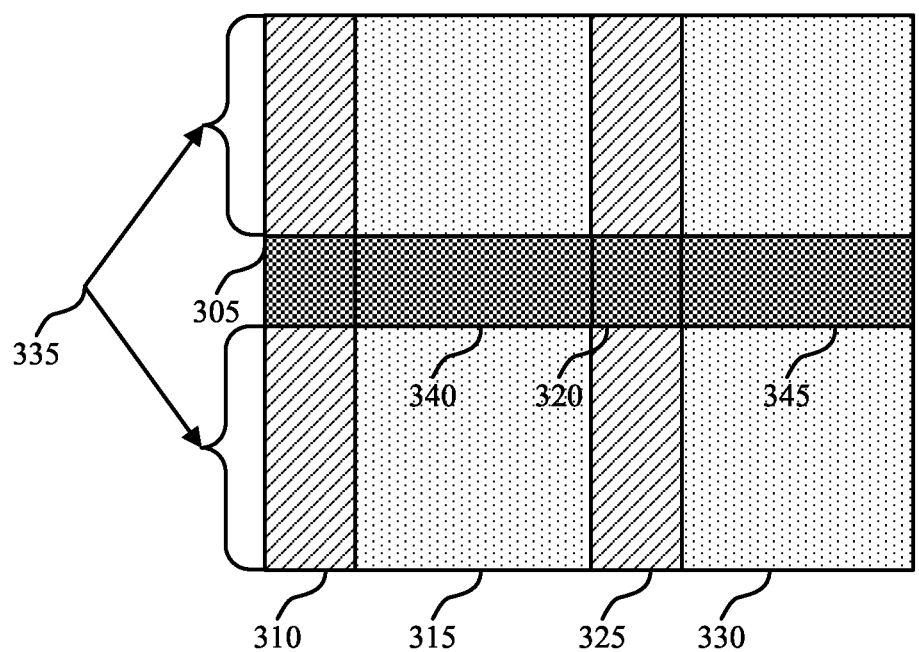
FIG. 3 illustrates an example of a reference signal processing that supports physical downlink shared channel reference signal puncturing in accordance with aspects of the present disclosure.

FIG. 3 illustrates an example of a reference signal processing 300 that supports physical downlink shared channel reference signal puncturing in accordance with aspects of the present disclosure. In some examples, the reference signal processing configuration 300 may implement aspects of wireless communications system 100 described with reference to FIG. 1, and the wireless communications system 200 described with reference to FIG. 2. The method described in FIG. 3 may be performed by a UE and a base station, which may be examples of the UE 115 and the base station 105 described with reference to FIGS. 1 and 2.

As depicted in the example of FIG. 3, a UE 115 may receive a physical downlink shared channel in a symbol 315 and a demodulation reference signal associated with the physical downlink shared channel in a symbol 310. As previously discussed, the UE 115 may be configured to demodulate the physical downlink shared channel using the demodulation reference signal. In the example of FIG. 3, the UE 115 may additionally receive a demodulation reference signal in a symbol 325 followed by the physical downlink shared channel in a symbol 330. Upon receiving the demodulation reference signal in the symbol 310, the UE 115 may identify an overlap between a first set of frequency resources allocated for the demodulation reference signal and a second set of frequency resources that are scheduled to puncture the first set of resources and that are unavailable for scheduling on the physical downlink shared channel. Additionally, the frequency resources allocated for the physical downlink shared channel in the symbol 315 may be overlapped by a set of puncturing frequency resources 340. Similarly, the frequency resources allocated for the physical downlink shared channel in the symbol 330 may be overlapped by a set of puncturing frequency resources 345. In the example of FIG. 3, the UE 115 may identify that frequency resources are overlapped with the second set of frequency resources 305 (such as resources not available to the physical downlink shared channel). The UE 115 may then determine a remaining set of frequency resources 335 from the first set of frequency resources for the symbol 310 based on the overlap. In some cases, the UE 115 may determine a subset of frequency resources from the remaining set of frequency resources 335 for each symbol of the set of symbols on which the demodulation reference signal is received (e.g., symbols 310 and 325).

In some cases, the UE 115 may determine the subset of frequency resources based on a reference signal processing configuration. In some examples, the UE 115 may receive the reference signal processing configuration transmitted by the base station 105. In some examples, the UE 115 may be preconfigured according to the reference signal processing configuration. Although in the example of FIG. 3, the subset of frequency resources is depicted to be the same as the remaining set of frequency resources 335, it may be understood that the subset of frequency resources may be different from the remaining set of frequency resources 335. In some examples, the UE 115 may receive a signal indicating the reference signal processing configuration from the base station 105. In some examples, the reference signal processing configuration may indicate that the subset of frequency resources is identical for each symbol (or time period) of the set of symbols over which the demodulation reference signal is received. The UE 115 may process the demodulation reference signal in the subset of frequency resources based on the reference signal processing configuration. For example, the UE 115 may determine that a set of demodulation reference signal resource elements, after being punctured by synchronization signal block resources or rate matching resources or both, may be identical in all demodulation reference signal symbols (e.g., symbols 310 and 325). As depicted in the example of FIG. 3, the UE 115 may assume that the demodulation reference signal in symbol 325 is punctured using the overlapping frequency resources 320 (such as resources not available to the physical downlink shared channel) which may be the same as an overlap between the demodulation reference signal resources in symbol 310 and the second set of frequency resources 305.

In some examples, the reference signal processing configuration may indicate that all demodulation reference signal symbols considered for processing the physical downlink shared channel may include at least one of a set of physical downlink shared channel demodulation reference signal symbols associated with the physical downlink shared channel in a mini-slot or in a slot; a set of symbols associated with multiple repetitions of the physical downlink shared channel in one or multiple slots scheduled by the same downlink control indicator; a set of symbols associated with multiple physical downlink shared channels scheduled by a multi-slot downlink control indicator; a set of symbols associated with multiple physical downlink shared channels in multiple slots semi-persistently scheduled and activated by the same downlink control indicator; a set of physical downlink shared channel demodulation reference signal symbols that are time domain bundled; or a combination thereof.

In some cases, a phase continuity of the reference signal associated with the physical downlink shared channel is configured for a bundle of symbols associated with the demodulation reference signal. In one example, the reference signal processing configuration may configure the UE 115 to identify a punctured symbol in a set of symbols and a subset of symbols remaining in the set of symbols after the punctured time period. The UE 115 may bundle the subset of symbols based on the reference signal processing configuration which indicated that bundling is disabled in the punctured symbol. For instance, the reference signal processing configuration may indicate that the UE 115 is expected to stop bundling at the punctured demodulation reference signal symbol and restart after the punctured symbol. Additionally or alternatively, the reference signal processing configuration may configure the UE 115 to refrain from time domain bundling the set of symbols if one of the symbols is punctured.

According to one or more examples, the physical downlink shared channel may include a broadcast physical downlink shared channel or a unicast physical downlink shared channel. In some cases, the broadcast physical downlink shared channel may be scheduled with at least one of a system information radio network temporary identifier, a random access radio network temporary identifier, a paging radio network temporary identifier, a temporary cell radio network temporary identifier, or a combination thereof. In some cases, the system information radio network temporary identifier may include a system information indicator in a downlink control indicator being set to a fixed value. In some cases, the unicast physical downlink shared channel may be scheduled with at least one of a physical downlink control channel including a cyclic redundancy check scrambled by at least one of a cell radio network temporary identifier, a modulation coding scheme radio network temporary identifier, a configured scheduling radio network temporary identifier, a physical downlink shared channel with semi-persistent scheduling, or a combination thereof.

Figure 4:
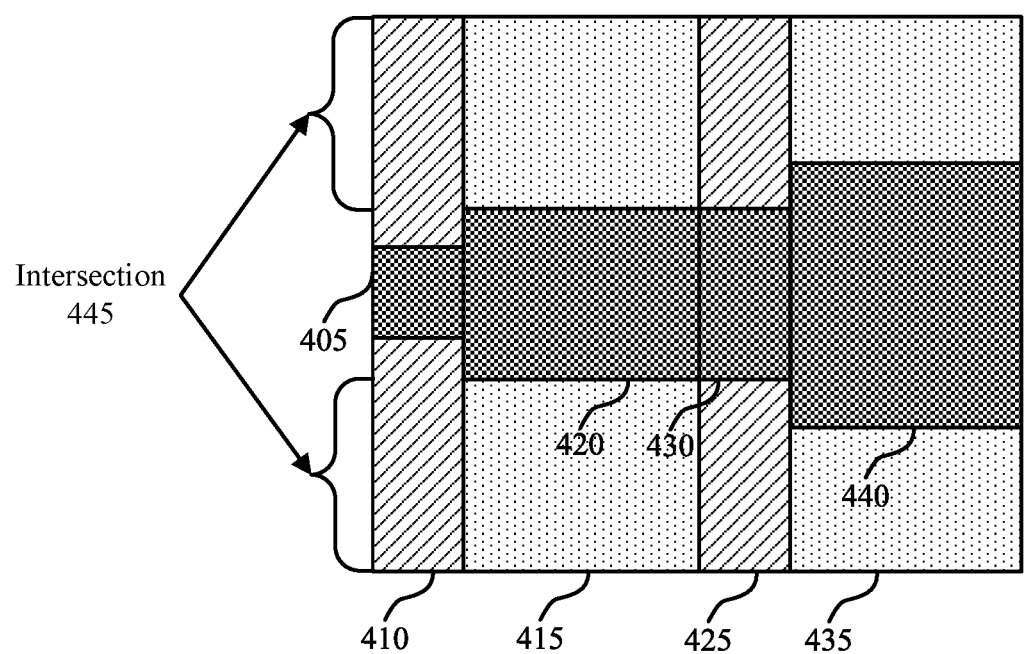
FIG. 4 illustrates an example of a reference signal processing that supports physical downlink shared channel reference signal puncturing in accordance with aspects of the present disclosure.

FIG. 4 illustrates an example of a reference signal processing 400 that supports physical downlink shared channel reference signal puncturing in accordance with aspects of the present disclosure. In some examples, the reference signal processing 400 may implement aspects of wireless communications system 100 as described in FIG. 1, and the wireless communications system 200 as described in FIG. 2. The method described in FIG. 4 may be performed by a UE and a base station, which may be examples of the UE 115 and the base station 105 described with reference to FIGS. 1 and 2.

According to one or more aspects of the present disclosure, a UE 115 may receive a demodulation reference signal in a symbol 410 and a physical downlink shared channel in a symbol 415. In some cases, the UE 115 may use the demodulation reference signal to demodulate the physical downlink shared channel in the symbol 415. In some cases, the UE 115 may determine a first set of frequency resources allocated for the demodulation reference signal. In the example of FIG. 4, the first set of frequency resources may include the frequency resources in symbol 410 and the frequency resources in symbol 425. In some cases, the UE 115 may identify an overlap between a first set of frequency resources allocated for the demodulation reference signal and a second set of frequency resources that are scheduled to puncture the first set of resources and that are unavailable for scheduling on the physical downlink shared channel. For example, the UE 115 may identify that a portion of the frequency resources in symbol 410 is overlapped with puncturing frequency resources 405 that are not available for the physical downlink shared channel. Additionally, the UE 115 may identify a portion of the frequency resources in symbol 425 is overlapped with puncturing frequency resources 430. In some cases, the UE 115 may determine a remaining set of frequency resources from the first set of frequency resources for the symbol 410 and the symbol 425 based on the overlap. In some examples, the UE 115 may identify a second set of symbols associated with the physical downlink shared channel. As depicted in the example of FIG. 4, the UE 115 may receive the physical downlink shared channel on a symbol 415 and a symbol 435. In some cases, the UE 115 may identify an overlap between a third set of frequency resources allocated for the physical downlink shared channel and the second set of frequency resources that are scheduled to puncture the third set of frequency resources. For example, the UE 115 may identify that a portion of the frequency resources in symbol 415 is overlapped with puncturing frequency resources 420. The UE 115 may also identify a portion of the frequency resources in symbol 435 is overlapped with puncturing frequency resources 440.

In some cases, the UE 115 may determine frequency resources remaining in the third set of frequency resources after rate matching around the second set of frequency resources. For example, the UE 115 may determine frequency resources remaining in symbol 415 and in symbol 435 after rate matching around the puncturing frequency resources 420 and the puncturing frequency resources 440 respectively. In some instances, the UE 115 may identify a largest common subset of frequency resources across all symbols of the set of symbols associated with the demodulation reference signal. In the example of FIG. 4, the UE 115 may determine a largest common subset of frequency resources across the symbol 410 and the symbol 425. The UE 115 may additionally identify a union of the second subset of frequency resources from the third set of frequency resources across all time periods of the set of time periods. In some examples, the UE 115 may receive a signal indicating the reference signal processing configuration from the base station 105. In some cases, the reference signal processing configuration may indicate or the UE 115 may handle the case that the largest common subset of frequency resources is sufficiently large to decode the physical downlink shared channel in the union of the second subset of frequency resources from the third set of frequency resources. That is, the UE 115 may determine that an intersection of resource elements associated with the demodulation reference signal after puncturing in all demodulation reference signal symbols covers the union of the resource elements associated with the physical downlink shared channel.

In some cases, the UE 115 may determine a subset of frequency resources from the remaining set of frequency resources for each symbol of the set of symbols based on a reference signal processing configuration. In some examples, the UE 115 may process the demodulation reference signal in the subset of frequency resources based on the reference signal processing configuration. In some cases, the UE 115 may receive the reference signal processing configuration from a base station 105. In some cases, the UE 115 may be preconfigured with the reference signal processing configuration. In some cases, the reference signal processing configuration may configure the UE 115 to discard a resource element from the remaining set of frequency resources that overlaps with the second set of frequency resources. That is, the reference signal processing configuration may configure the UE 115 to discard an overlapping resource element. Additionally or alternatively, the reference signal processing configuration may configure the UE 115 to discard, from the subset of frequency resources, a resource block from the remaining set of frequency resources that overlaps by at least one resource element with the second set of frequency resources. For example, the reference signal processing configuration may configure the UE 115 to discard a resource block if it is partially punctured. In some cases, the reference signal processing configuration may configure the UE 115 to include, in the subset of frequency resources, a resource block from the remaining set of frequency resources that contains at least one resource element that does not overlap by any resource element with the second set of frequency resources. For example, the reference signal processing configuration may configure the UE 115 to consider a partial resource block as a full resource block for processing the demodulation reference signal.

According to one or more aspects of the present disclosure, the reference signal processing configuration may indicate the UE 115 to discard, from the subset of frequency resources, a precoding resource block group from the remaining set of frequency resources that overlaps by at least one resource element with the second set of frequency resources. That is, the UE 115 may discard a precoding resource block group if the precoding resource block group is partially punctured. In some cases, the UE 115 may identify that a precoding resource block group size for the first set of frequency resources is configured as wideband and assume that the precoding resource block group size is configured to be at a default size less than wideband. For example, the reference signal processing configuration may configure the UE 115 to assume the precoding resource block group size to be at a default granularity (such as two or four) instead of wideband. In some cases, the default granularity may be based on a radio resource control signal received from the base station 105, or a capability associated with the UE 115, or a combination thereof. Thus, the UE 115 may be configured to assume via radio resource control signal or UE capability, a default size for the precoding resource block group if the precoding resource block group is configured as wideband.

As previously discussed, the reference signal processing configuration may define the demodulation reference signal symbols for processing the physical downlink shared channel. For example, the reference signal processing configuration may define that the symbol 410 and the symbol 425 may be considered for processing the physical downlink shared channel. For example, the reference signal processing configuration may define the demodulation reference signal symbols to include at least one of a set of symbols associated with the physical downlink shared channel in a slot, a set of symbols associated with multiple repetitions of the physical downlink shared channel in one or multiple slots scheduled by the same downlink control indicator, a set of symbols associated with multiple physical downlink shared channels scheduled by a multi-slot downlink control indicator, a set of symbols associated with multiple physical downlink shared channels in multiple slots semi-persistently scheduled and activated by the same downlink control indicator, or a combination thereof. According to one or more examples, the physical downlink shared channel may include a broadcast physical downlink shared channel or a unicast physical downlink shared channel.

Figure 5:
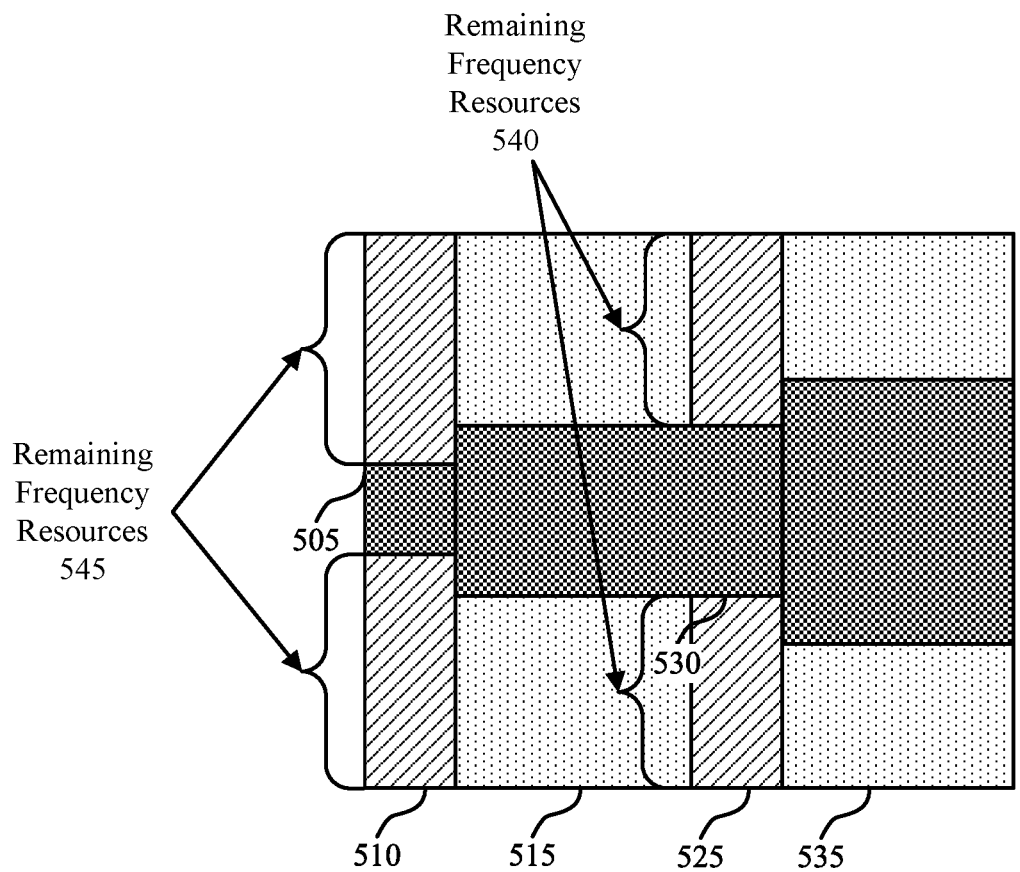
FIG. 5 illustrates an example of a reference signal processing that supports physical downlink shared channel reference signal puncturing in accordance with aspects of the present disclosure.

FIG. 5 illustrates an example of a reference signal processing 500 that supports physical downlink shared channel reference signal puncturing in accordance with aspects of the present disclosure. In some examples, the reference signal processing 500 may implement aspects of wireless communications system 100 as described in FIG. 1, and the wireless communications system 200 as described in FIG. 2. The method described in FIG. 5 may be performed by a UE and a base station, which may be examples of the UE 115 and the base station 105 described with reference to FIGS. 1 and 2.

As previously described with reference to FIGS. 1 through 4, a UE 115 may receive a demodulation reference signal over one or more symbols and a physical downlink shared channel over one or more symbols. As depicted in the example of FIG. 5, the UE 115 may receive a demodulation reference signal in a symbol 510 and a physical downlink shared channel in a symbol 515. Additionally, the UE 115 may receive a demodulation reference signal in a symbol 525 and a physical downlink shared channel in a symbol 535. In some cases, the UE 115 may determine a first set of frequency resources allocated for the demodulation reference signal (such as frequency resources in symbol 510 and the frequency resources in symbol 525). In some cases, the UE 115 may identify an overlap between a first set of frequency resources allocated for the demodulation reference signal and a second set of frequency resources that are scheduled to puncture the first set of resources and that are unavailable for scheduling on the physical downlink shared channel. As depicted in the example of FIG. 5, the UE 115 may identify that a portion of the frequency resources in symbol 510 is overlapped with puncturing frequency resources 505, and a portion of the frequency resources in symbol 525 is overlapped with puncturing frequency resources 530. The UE 115 may additionally determine a remaining set of frequency resources from the first set of frequency resources for each symbol of the set of symbols based on the overlap. For example, the UE 115 may determine a remaining set of frequency resources from the frequency resources in the symbol 510 and the frequency resources in the symbol 525.

According to one or more aspects of the present disclosure, the UE may determine a subset of frequency resources from the remaining set of frequency resources for each demodulation reference signal symbol (such as symbol 510 and symbol 525) based on a reference signal processing configuration. In one example, the reference signal processing configuration may indicate that the subset of frequency resources includes a largest common subset of frequency resources across all symbols associated with the demodulation reference signal (such as symbol 510 and symbol 525).

That is, the reference signal processing configuration may configure the UE 115 to process the demodulation reference signal in the intersection of demodulation reference signal resource elements after puncturing in all demodulation reference signal symbols. As depicted in the example of FIG. 5, the UE 115 may determine the remaining set of frequency resources 545 from the symbol 510 and the remaining set of frequency resources 540 from the symbol 525. The UE 115 may then determine a largest common subset of frequency resources across the symbol 510 and the symbol 525. In the example of FIG. 5, the largest common subset of frequency resources may correspond to the remaining set of frequency resources 540. In some cases, the reference signal processing configuration may configure the UE 115 to assume that a base station is not guaranteed to transmit demodulation reference signals in the remaining resource elements.

In some implementations, the reference signal processing configuration may define the demodulation reference signal symbols for processing the physical downlink shared channel. In some examples, the physical downlink shared channel may include a broadcast physical downlink shared channel or a unicast physical downlink shared channel. In some examples, the broadcast physical downlink shared channel may be scheduled with at least one of a system information radio network temporary identifier, a random access radio network temporary identifier, a paging radio network temporary identifier, a temporary cell radio network temporary identifier, or a combination thereof. In some examples, the system information radio network temporary identifier may include a system information indicator in a downlink control indicator being set to a fixed value. In some cases, the unicast physical downlink shared channel may be scheduled with at least one of a physical downlink control channel including a cyclic redundancy check scrambled by one or more identifiers. The one or more identifiers may include a cell radio network temporary identifier, a modulation coding scheme radio network temporary identifier, a configured scheduling radio network temporary identifier, a physical downlink shared channel with semi-persistent scheduling, or a combination thereof.

Figure 6:
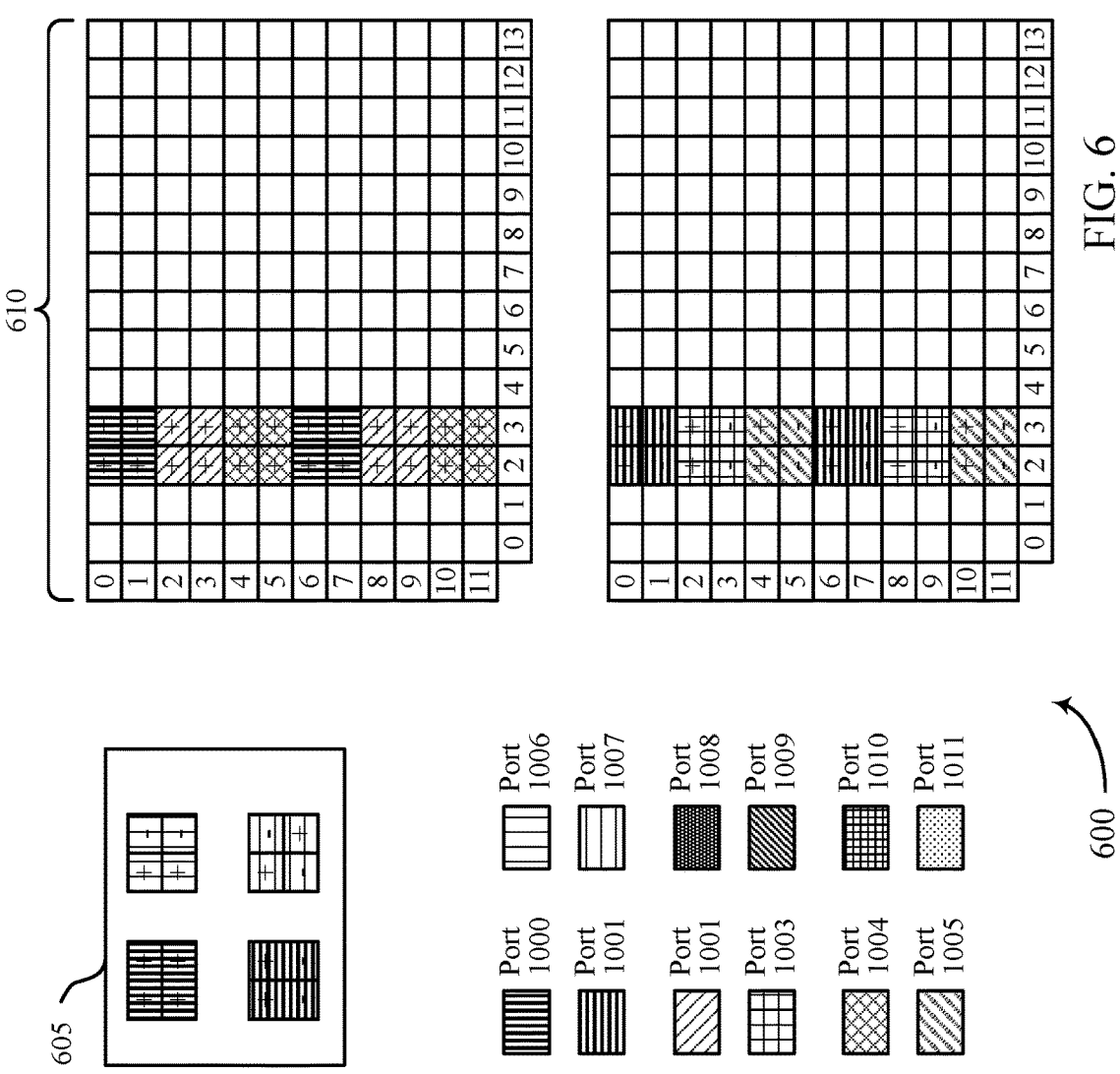
FIG. 6 illustrates an example of a resource configuration that supports physical downlink shared channel reference signal puncturing in accordance with aspects of the present disclosure.

FIG. 6 illustrates an example of a resource configuration 600 that supports physical downlink shared channel reference signal puncturing in accordance with aspects of the present disclosure. In some examples, the resource configuration 600 may implement aspects of wireless communications system 100. The resource configuration 600 illustrates an example frame structure design for communications in a wireless communications system, which may implement aspects of the wireless communications system 100 as described with reference to FIG. 1. The resource configuration 600 shows a set of demodulation reference signal resources (e.g., a set time-frequency resources) and a mapping to a number of antenna ports that a base station may use to transmit demodulation reference signals to a UE, which may be examples of the corresponding devices as described with reference to FIG. 1.

The example resource configuration 600 of FIG. 6 shows four orthogonal resource blocks 610. The four resource blocks 610 may be orthogonalized using an orthogonal cover code (e.g., a length-4 orthogonal cover code). As shown, each of the resource blocks 610 includes 14 symbols in the time domain and 12 subcarriers in the frequency domain. A number of resource elements are shown in each resource block 610, where each resource element is defined by one symbol in the time domain and one subcarrier in the frequency domain. While the resource configuration 600 shows the resource blocks 610 as including 14 symbols and 12 subcarriers, it is to be understood that the resource configuration 600 is one example, and the resource configuration 600 may be analogously applied to configure a demodulation reference signal pattern for a resource block including any number of uniform or non-uniform symbols and subcarriers.

The example resource configuration 600 of FIG. 6 shows demodulation reference signal resources that are configured for transmitting and receiving demodulation reference signals of a second type (e.g., Type 2) with a length of two symbols (e.g., a double-symbol length), that is, a "double-symbol Type 2" demodulation reference signal configuration. According to the resource configuration 600, the base station may transmit demodulation reference signals over the demodulation reference signal resources using up to 12 antenna ports. As the example resource configuration 600 shows, the demodulation reference signal resources may occupy a third symbol and a fourth symbol (e.g., symbols 2 and 3) of each resource block. The resource configuration 600 shows demodulation reference signal resources for a front-loaded demodulation reference signal pattern in each resource block. That is, the front-loaded demodulation reference signal pattern may be for an initial demodulation reference signal transmission within the resource blocks 610 using the demodulation reference signal resources (e.g., an initial demodulation reference signal transmission of one or more demodulation reference signal transmissions). It is to be understood, however, that additional resource elements of the resource blocks may be allocated for additional demodulation reference signal transmissions subsequent to the demodulation reference signal resources shown in the example resource configuration 600 of FIG. 6.

According to the double-symbol Type 2 demodulation reference signal configuration shown in the resource configuration 600, the base station may transmit demodulation reference signals to the UE over the demodulation reference signal resources using up to 12 antenna ports. As depicted in the example of FIG. 6, the demodulation reference signal pattern 605 includes orthogonal demodulation reference signal patterns, where the demodulation reference signal patterns are orthogonal in (2*2) frequency and time resource element sets.

As previously described with reference to FIGS. 1 through 5, a UE 115 may receive a demodulation reference signal over one or more symbols and a physical downlink shared channel over one or more symbols. For example, the UE 115 may receive the demodulation reference signal using the demodulation reference signal resources as discussed herein with reference to FIG. 6. The UE 115 may identify an overlap between frequency resources allocated for the demodulation reference signal and a second set of frequency resources that are scheduled to puncture the first set of resources and that are unavailable for scheduling on the physical downlink shared channel. In some examples, the UE 115 may determine a remaining set of frequency resources from the frequency resources in the symbols associated with a demodulation reference signal. A precoding resource block group size for a first set of frequency resources (e.g., frequency resources allocated for the demodulation reference signal) may be configured as wideband. Additionally or alternatively, the physical downlink shared channel may be configured with a frequency domain resource allocation type 1 for contiguous resource block allocation. In some cases, the second set of frequency resources may include resource element level rate matching resources. In some implementations, the UE 115 may determine a subset of frequency resources from the remaining set of frequency resources for each time symbol based on a reference signal processing configuration. In one implementation, the reference signal processing configuration may configure the UE 115 such that the UE 115 is not expected to process, from the subset of frequency resources, a resource block from the remaining set of frequency resources having a resource element that overlaps with the resource element level rate matching resource. That is, the reference signal processing configuration may not configure the UE 115 to process a resource block if a demodulation reference signal collides with a resource element of a rate matching resource.

In some examples, the first set of frequency resources may include a first resource element in a set of resource elements associated with a time division orthogonal cover code or a frequency division orthogonal cover code. Additionally or alternatively, the second set of frequency resources may include a resource element level rate matching resource that overlaps with at least the first resource element in the set of resource elements.

Figure 7:
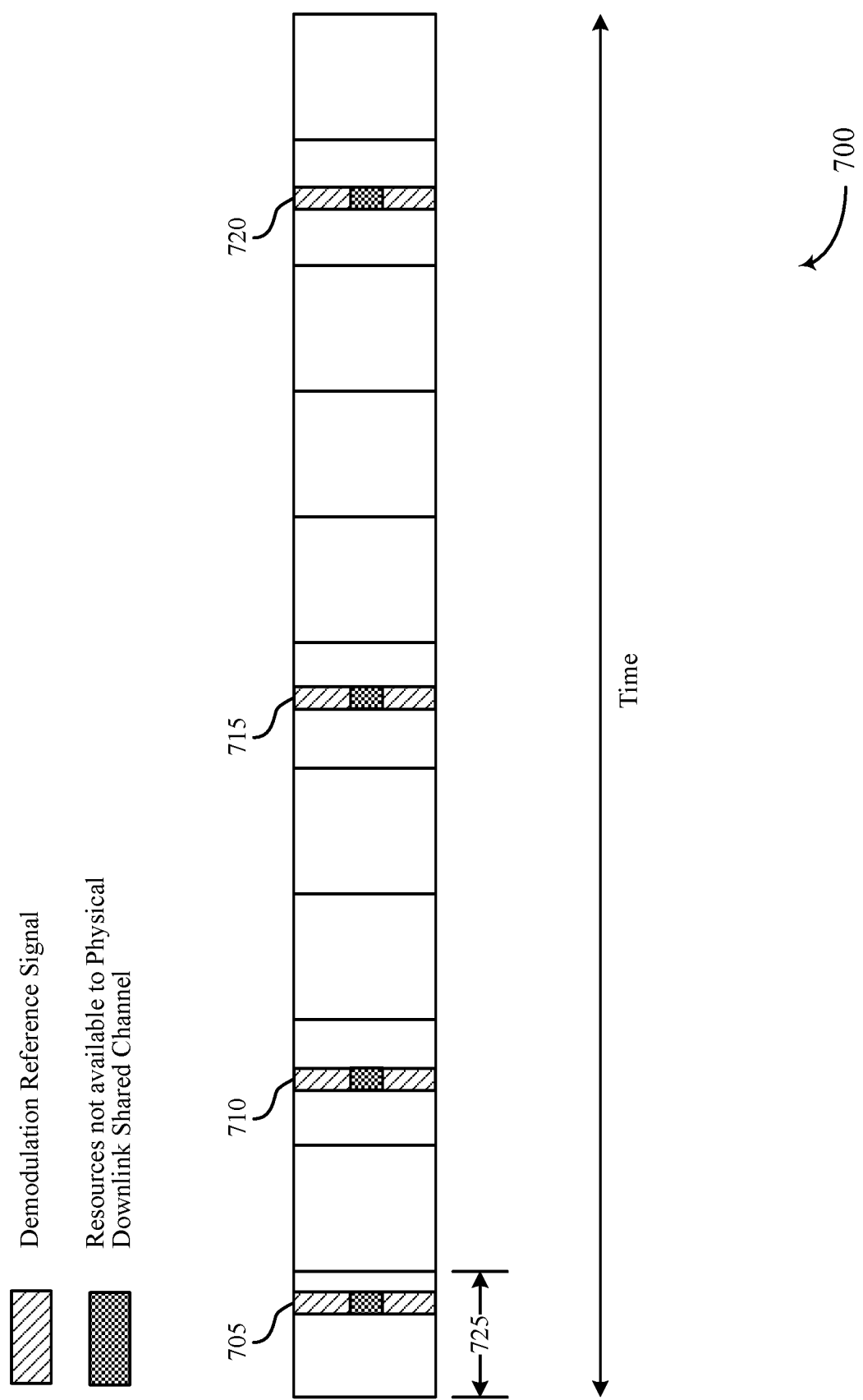
FIG. 7 illustrates an example of a timeline that supports physical downlink shared channel reference signal puncturing in accordance with aspects of the present disclosure.

FIG. 7 illustrates an example of a timeline 700 that supports physical downlink shared channel reference signal puncturing in accordance with aspects of the present disclosure. In some examples, the timeline 700 may implement aspects of wireless communications system 100.

According to one or more aspects, a UE 115 may receive a demodulation reference signal associated with physical downlink shared channel over a first set of frequency resources. In some cases, a precoding resource block group size for the first set of frequency resources is configured as wideband or the physical downlink shared channel is configured with a frequency domain resource allocation type 1 for contiguous resource block allocation. The UE 115 may identify an overlap between the first set of frequency resources allocated for the demodulation reference signal and a second set of frequency resources that are scheduled to puncture the first set of resources and that are unavailable for scheduling on the physical downlink shared channel. In some examples, the UE 115 may process the demodulation reference signal in the subset of frequency resources based on a reference signal processing configuration. In some cases, the reference signal processing configuration may indicate that the subset of frequency resources includes a number of frequency segments of contiguous resource blocks that is less than or equal to a threshold.

As depicted in the example of FIG. 7, the UE 115 may identify the demodulation reference signal in symbols 705, 710, 715 and 720 within contiguous resource blocks 725. In some cases, the frequency resources for the demodulation reference signal in symbols 705, 710, 715 and 720 may be overlapped with synchronization signal block resources or rate matching resources. The UE 115 may determine that a number of frequency segments associated with the demodulation reference signal in the contiguous resource blocks 725 does not exceed a maximum number. In some cases, the number of frequency segments may be based on a largest common subset of frequency resources from the remaining set of frequency resources across all symbols of the set of symbols (e.g., symbols 705, 710, 715 and 720). For example, the reference signal processing configuration may configure the UE 115 to determine the number of frequency segments as the intersection of the resource elements associated with the demodulation reference signal after puncturing in all demodulation reference signal symbols (or symbols 705, 710, 715 and 720). Additionally or alternatively, the reference signal processing configuration may configure the number of frequency segments to be based on a subset of frequency resources in each symbol of the set of symbols associated with the demodulation reference signal. That is, the reference signal processing configuration may configure that the number of frequency segments is based on the remaining frequency resources after overlap in each of the symbols 705, 710, 715 and 720.

According to one or more aspects of the present disclosure, the reference signal processing configuration may indicate that a total number of frequency resources of a second set of frequency resources (e.g., the resources not available to the physical downlink shared channel) is less than or equal to a threshold. In some cases, the total number of frequency resources of the second set of frequency resources corresponds to any symbol of the set of symbols. In some examples, the reference signal processing configuration may configure the UE 115 to identify that a first symbol of the set of symbols (such as symbols 705, 710, 715 and 720) and a second symbol of the set of symbols are associated with a time division orthogonal cover code. If the time division orthogonal cover code of two symbols are configured, the UE 115 may identify a distinct number of frequency resources that are scheduled to puncture the first set of resources allocated for the demodulation reference signal. In some examples, the total number of frequency resources of the second set of frequency resources is based on the distinct number of frequency resources. That is, the UE 115 may identify a distinct number of puncturing resources within symbols 705, 710, 715, and 720, where the total number of frequency resources of the second set of frequency resources is based on the summation of the distinct number of frequency resources.

As previously described, the reference signal processing configuration may indicate that all demodulation reference signal symbols (such as symbols 705, 710, 715, and 720) considered for processing the physical downlink shared channel may include at least one of a set of symbols associated with the physical downlink shared channel in a slot or a mini-slot, a set of symbols associated with multiple repetitions of the physical downlink shared channel in one or multiple slots scheduled by the same downlink control indicator, a set of symbols associated with multiple physical downlink shared channels scheduled by a multi-slot downlink control indicator, a set of symbols associated with multiple physical downlink shared channels in multiple slots semi-persistently scheduled and activated by the same downlink control indicator, a set of time domain bundled physical downlink shared channel demodulation reference signal, or a combination thereof. In some cases, a phase continuity of the reference signal associated with the physical downlink shared channel is configured for a bundle of symbols associated with the demodulation reference signal. In one example, the reference signal processing configuration may configure the UE 115 to identify a punctured symbol in a set of symbols and a subset of symbols remaining in the set of symbols after the punctured time period. The UE 115 may then bundle the subset of symbols based on the reference signal processing configuration which indicated that bundling is disabled in the punctured symbol. For instance, the reference signal processing configuration may indicate that the UE 115 is expected to stop bundling at the punctured demodulation reference signal symbol and restart after the punctured symbol. For example, if the symbols in slot 4 are punctured, then the UE 115 is expected to bundle slots [1,2,3], and [5,6,7,8], and assume that bundling is not enabled in slot 4. Additionally or alternatively, the reference signal processing configuration may configure the UE 115 to refrain from time domain bundling the set of symbols if one of the symbols is punctured.

According to one or more examples, the physical downlink shared channel may include a broadcast physical downlink shared channel or a unicast physical downlink shared channel. It may be understood that the examples depicted in FIGS. 3 through 7 may be separately applied to broadcast physical downlink shared channel, unicast physical downlink shared channel, or both. In some cases, the broadcast physical downlink shared channel may be scheduled with at least one of a system information radio network temporary identifier, a random access radio network temporary identifier, a paging radio network temporary identifier, a temporary cell radio network temporary identifier, or a combination thereof. In some cases, the system information radio network temporary identifier may include a system information indicator in a downlink control indicator being set to a fixed value. In some cases, the unicast physical downlink shared channel may be scheduled with at least one of a physical downlink control channel including a cyclic redundancy check scrambled by at least one of a cell radio network temporary identifier, a modulation coding scheme radio network temporary identifier, a configured scheduling radio network temporary identifier, a physical downlink shared channel with semi-persistent scheduling or a combination thereof.

Figure 8:
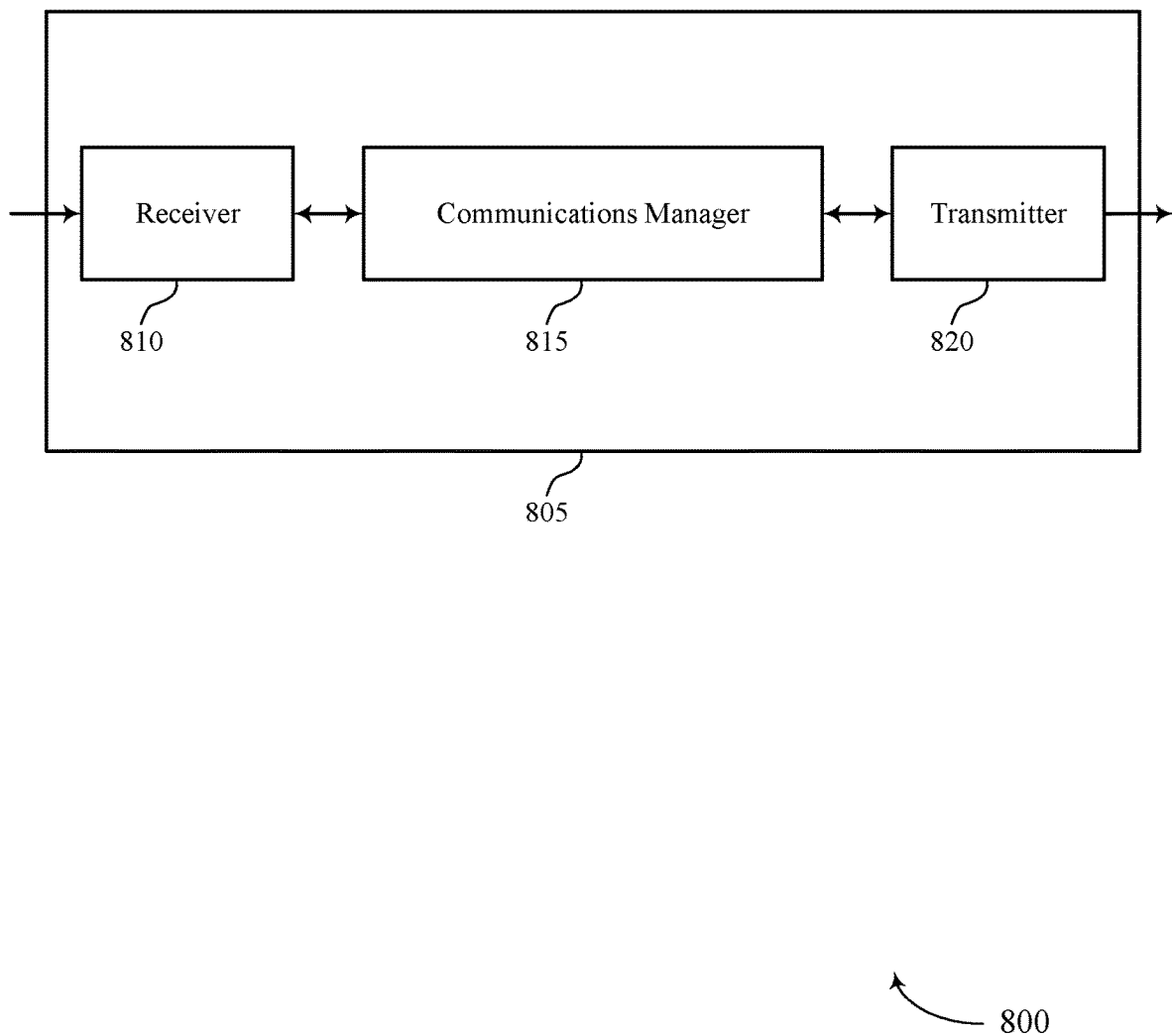
FIGS. 8 and 9 show block diagrams of devices that support physical downlink shared channel reference signal puncturing in accordance with aspects of the present disclosure.

FIG. 8 shows a block diagram 800 of a device 805 that supports physical downlink shared channel reference signal puncturing in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to physical downlink shared channel reference signal puncturing, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a reference signal associated with the physical downlink shared channel, identify, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and process the reference signal in the subset of frequency resources based on the reference signal processing configuration. The communications manager 815 may be an example of aspects of the communications manager 1110 described herein. The actions performed by the communications manager 815 as described herein may be implemented to realize one or more potential advantages. One implementation may allow a UE 115 to increase spectral efficiency by puncturing resources. Another implementation may provide improved quality and reliability of service at the UE 115, as latency may be reduced.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
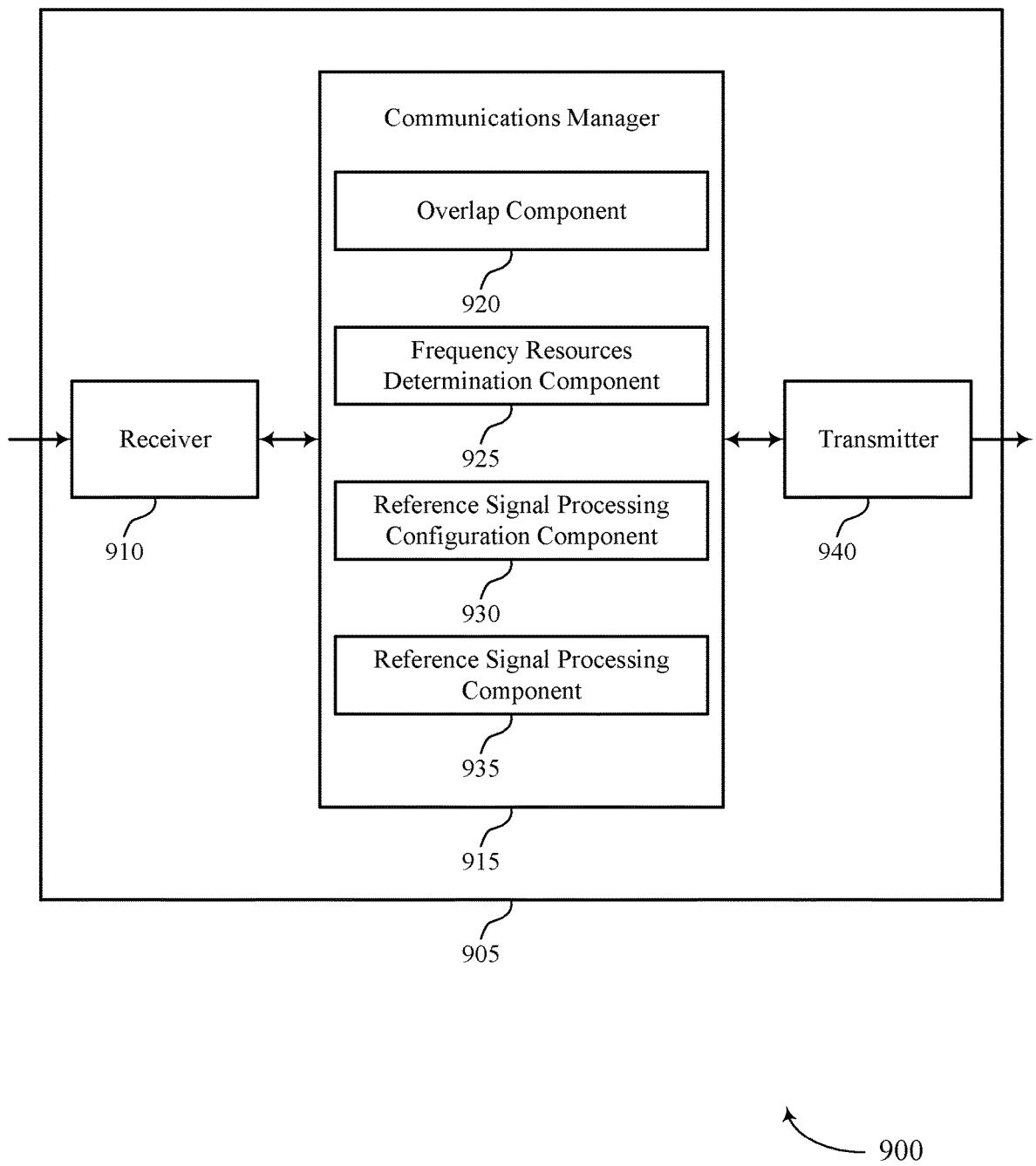

FIG. 9 shows a block diagram 900 of a device 905 that supports physical downlink shared channel reference signal puncturing in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to physical downlink shared channel reference signal puncturing, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an overlap component 920, a frequency resources determination component 925, a reference signal processing configuration component 930, and a reference signal processing component 935. The communications manager 915 may be an example of aspects of the communications manager 1110 described herein.

The overlap component 920 may receive, from a base station, a reference signal associated with the physical downlink shared channel. The overlap component 920 may identify, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel. The frequency resources determination component 925 may determine a remaining set of frequency resources from the first set of frequency resources for each time period of the set of time periods based on the overlap. The reference signal processing configuration component 930 may determine a subset of frequency resources from the remaining set of frequency resources for each time period of the set of time periods based on a reference signal processing configuration. The reference signal processing component 935 may process the reference signal in the subset of frequency resources based on the reference signal processing configuration.

In some examples, based on identifying an overlap between a first set of frequency resources allocated for the reference signal and a second set of frequency resources that are scheduled to puncture the first set of resources and that are unavailable for scheduling on the physical downlink shared channel, a processor of a UE 115 (e.g., controlling the receiver 910, the transmitter 940, or the transceiver 1120 as described with reference to FIG. 11) may efficiently determine a subset of frequency resources from the remaining set of frequency resources for each time period of the set of time periods based on a reference signal processing configuration. Further, the processor of UE 115 may process the reference signal in the subset of frequency resources based on the reference signal processing configuration. The processor of the UE 115 may turn on one or more processing units for processing the reference signal, increase a processing clock, or a similar mechanism within the UE 115. As such, when the reference signal is processed, the processor may be ready to respond more efficiently through the reduction of a ramp up in processing power. The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
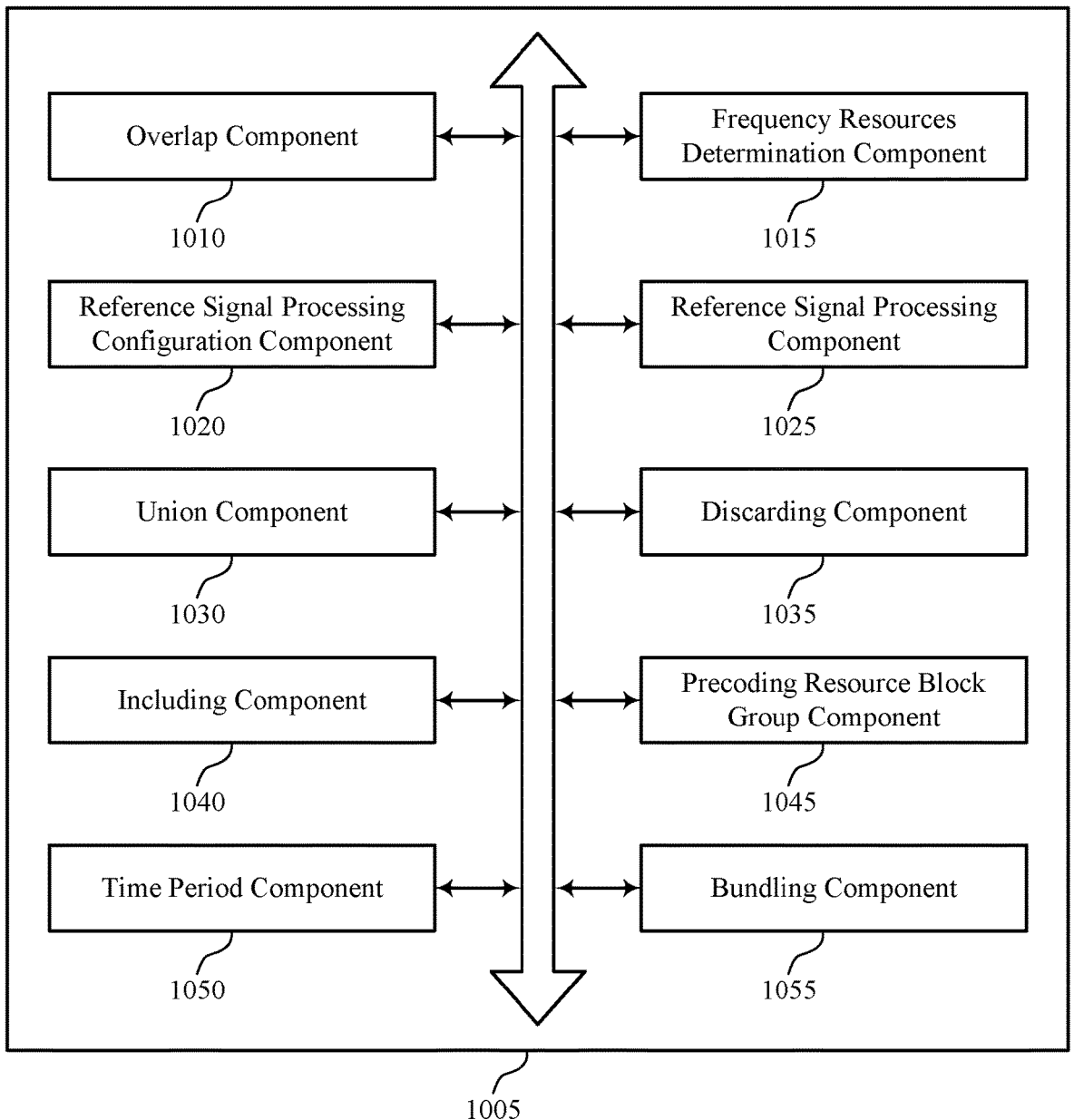
FIG. 10 shows a block diagram of a communications manager that supports physical downlink shared channel reference signal puncturing in accordance with aspects of the present disclosure.

FIG. 10 shows a block diagram 1000 of a communications manager 1005 that supports physical downlink shared channel reference signal puncturing in accordance with aspects of the present disclosure. The communications manager 1005 may be an example of aspects of a communications manager 815, a communications manager 915, or a communications manager 1110 described herein. The communications manager 1005 may include an overlap component 1010, a frequency resources determination component 1015, a reference signal processing configuration component 1020, a reference signal processing component 1025, an union component 1030, a discarding component 1035, an including component 1040, a precoding resource block group component 1045, a time period component 1050, and a bundling component 1055. Each of these modules may communicate, directly or indirectly, with one another (e.g., via one or more buses).

The overlap component 1010 may receive, from a base station, a reference signal associated with the physical downlink shared channel. The overlap component 1010 may identify, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel. In some cases, the physical downlink shared channel includes a broadcast physical downlink shared channel or a unicast physical downlink shared channel. In some cases, the broadcast physical downlink shared channel is scheduled with at least one of a system information radio network temporary identifier, a random access radio network temporary identifier, a paging radio network temporary identifier, a temporary cell radio network temporary identifier, or a combination thereof.

In some cases, the system information radio network temporary identifier includes a system information indicator in a downlink control indicator being set to a fixed value. In some cases, the unicast physical downlink shared channel is scheduled with at least one of a physical downlink control channel including a cyclic redundancy check scrambled by one or more identifiers. In some cases, the one or more identifiers include at least one of a cell radio network temporary identifier, a modulation coding scheme radio network temporary identifier, a configured scheduling radio network temporary identifier, a physical downlink shared channel with semi-persistent scheduling or a combination thereof. In some cases, the second set of frequency resources includes a synchronization signal block resource or a rate matching resource or both. In some cases, the set of time periods associated with the reference signal include a set of symbols. In some cases, the reference signal includes a demodulation reference signal.

The frequency resources determination component 1015 may determine a remaining set of frequency resources from the first set of frequency resources for each time period of the set of time periods based on the overlap. The reference signal processing configuration component 1020 may determine a subset of frequency resources from the remaining set of frequency resources for each time period of the set of time periods based on a reference signal processing configuration. In some examples, the reference signal processing configuration component 1020 may receive, from a base station, a signal indicating the reference signal processing configuration. The reference signal processing component 1025 may process the reference signal in the subset of frequency resources based on the reference signal processing configuration.

In some examples, the overlap component 1010 may identify, for a second set of time periods associated with the physical downlink shared channel, an overlap between a third set of frequency resources allocated for the physical downlink shared channel and the second set of frequency resources that are scheduled to puncture the third set of frequency resources. In some examples, reference signal processing configuration component 1020 may determine, a second subset of frequency resources from the third set of frequency resources for each time period of the second set of time periods based on the overlap between the third set of frequency resources and the second set of frequency resources, where the second subset of frequency resources includes frequency resources remaining in the third set of frequency resources after rate matching around the second set of frequency resources.

In some examples, the frequency resources determination component 1015 may identify, from the remaining set of frequency resources, a largest common subset of frequency resources across all time periods of the set of time periods. The union component 1030 may identify a union of the second subset of frequency resources from the third set of frequency resources across all time periods of the set of time periods, where the reference signal processing configuration indicates that the largest common subset of frequency resources is sufficiently large to decode the physical downlink shared channel in the union of the second subset of frequency resources from the third set of frequency resources.

The discarding component 1035 may discard, from the subset of frequency resources, a resource element from the remaining set of frequency resources that overlaps with the second set of frequency resources. In some examples, the discarding component 1035 may discard, from the subset of frequency resources, a resource block from the remaining set of frequency resources that overlaps by at least one resource element with the second set of frequency resources. The including component 1040 may include, in the subset of frequency resources, a resource block from the remaining set of frequency resources that contains at least one resource element that does not overlap by any resource element with the second set of frequency resources.

The precoding resource block group component 1045 may identify that a precoding resource block group size for the first set of frequency resources is configured as wideband. In some examples, the precoding resource block group component 1045 may assume that the precoding resource block group size is configured as a default size that is less than wideband. In some examples, the discarding component 1035 may discard, from the subset of frequency resources, a precoding resource block group from the remaining set of frequency resources that overlaps by at least one resource element with the second set of frequency resources.

In some examples, the precoding resource block group component 1045 may assume that the precoding resource block group size is configured as the default size based on at least one of a radio resource control signal received from a base station, a capability associated with the UE, or a combination thereof. In some cases, the reference signal processing configuration indicates that the subset of frequency resources includes a largest common subset of frequency resources across all time periods of the set of time periods.

In some cases, a precoding resource block group size for the first set of frequency resources is configured as wideband or the physical downlink shared channel is configured with a first frequency domain resource allocation type, and where the second set of frequency resources includes resource element level rate matching resource. In some examples, the discarding component 1035 may discard, from the subset of frequency resources, a resource block from the remaining set of frequency resources having a resource element that overlaps with the resource element level rate matching resource. In some examples, the discarding component 1035 may discard, from the subset of frequency resources, the set of resource elements.

In some cases, a precoding resource block group size for the first set of frequency resources is configured as wideband or the physical downlink shared channel is configured with a first frequency domain resource allocation type and where the reference signal processing configuration indicates that the subset of frequency resources includes a number of frequency segments of contiguous resource blocks that is less than or equal to a threshold. In some cases, the number of frequency segments is based on a largest common subset of frequency resources from the remaining set of frequency resources across all time periods of the set of time periods. In some cases, the number of frequency segments is based on the subset of frequency resources in each time period of the set of time periods.

In some cases, the reference signal processing configuration indicates that a total number of frequency resources of the second set of frequency resources is less than or equal to a threshold. In some cases, the total number of frequency resources of the second set of frequency resources corresponds to any time period of the set of time periods.

In some examples, the frequency resources determination component 1015 may identify, in the first time period and the second time period, a distinct number of frequency resources that are scheduled to puncture the first set of resources allocated for the reference signal, where the total number of frequency resources of the second set of frequency resources is based on the distinct number of frequency resources. In some examples, the frequency resources determination component 1015 may identify, in the set of time periods, a distinct number of frequency resources that are scheduled to puncture the first set of resources allocated for the reference signal, where the total number of frequency resources of the second set of frequency resources is based on the distinct number of frequency resources.

In some cases, the reference signal processing configuration indicates that the set of time periods associated with the reference signal includes at least one of a set of time periods associated with the physical downlink shared channel in a slot, a set of time periods associated with multiple repetitions of the physical downlink shared channel in one or multiple slots scheduled by the same downlink control indicator, a set of time periods associated with multiple physical downlink shared channels scheduled by a multi-slot downlink control indicator, a set of time periods associated with multiple physical downlink shared channels in multiple slots semi-persistently scheduled and activated by the same downlink control indicator, or a combination thereof. In some cases, the phase continuity of the reference signal associated with the physical downlink shared channel is configured for a bundle of time periods of the set of time periods associated with the reference signal.

The time period component 1050 may identify that a first time period of the set of time periods and a second time period of the set of time periods are associated with a time division orthogonal cover code. In some examples, the time period component 1050 may identify a punctured time period in the set of time periods and a subset of time periods remaining in the set of time periods after the punctured time period. In some examples, the time period component 1050 may identify a punctured time period in the set of time periods. The bundling component 1055 may bundle the subset of time periods based on the reference signal processing configuration, where the reference signal processing configuration indicates that bundling is disabled in the punctured time period. In some examples, the bundling component 1055 may refrain from bundling the set of time periods based on the reference signal processing configuration.

In some cases, the first set of frequency resources includes a first resource element in a set of resource elements associated with a time division orthogonal cover code or a frequency division orthogonal cover code, and where the second set of frequency resources includes a resource element level rate matching resource that overlaps with at least the first resource element in the set of resource elements. In some cases, the reference signal processing configuration indicates that the subset of frequency resources is identical for each time period of the set of time periods. In some examples, the discarding component 1035 may discard from the subset of frequency resources a precoding resource block group from the remaining set of frequency resources that overlaps by at least one resource element with the second set of frequency resources based on assuming that the precoding resource block group size is configured as the default size.

Figure 11:
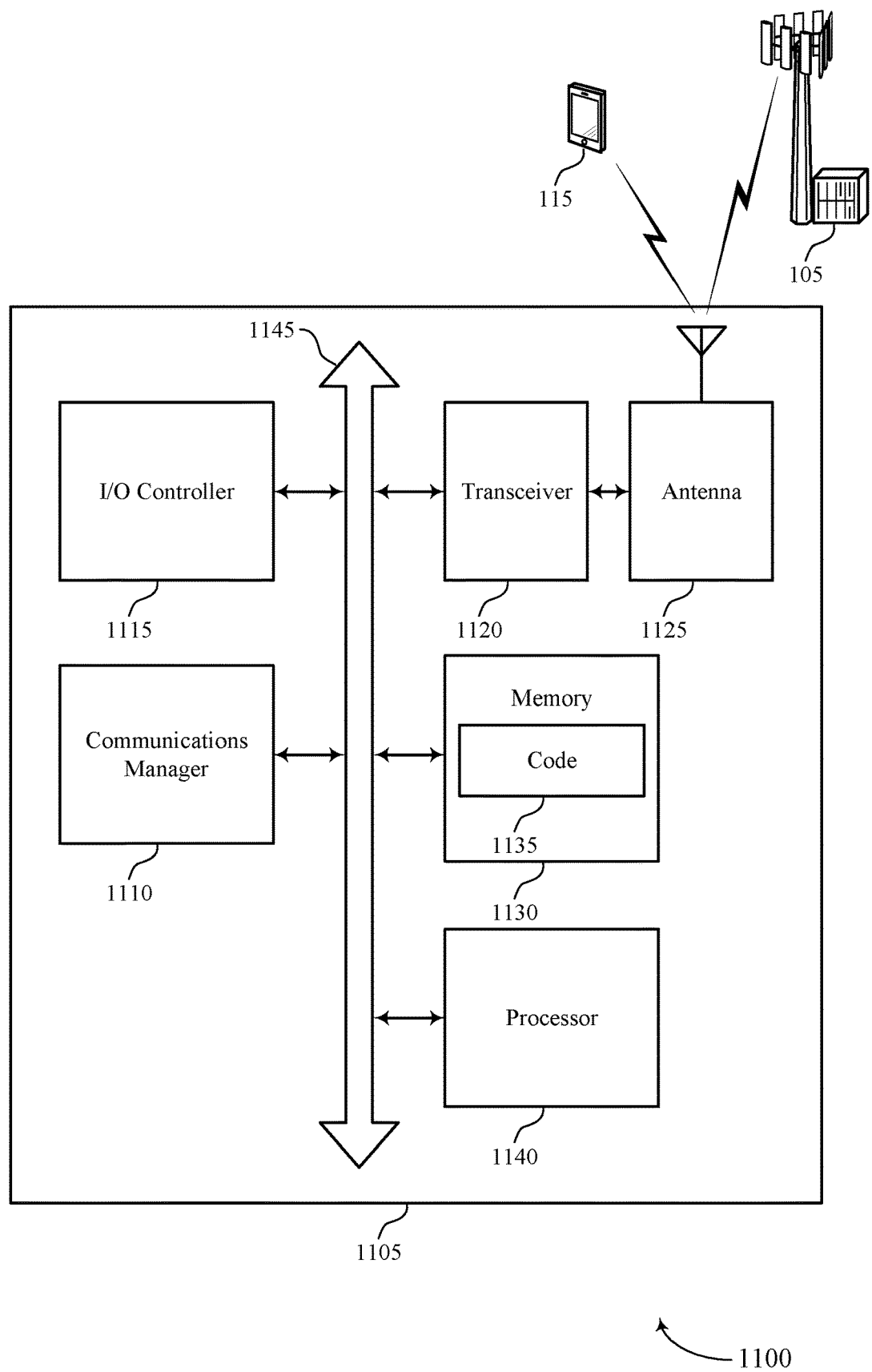
FIG. 11 shows a diagram of a system including a device that supports physical downlink shared channel reference signal puncturing in accordance with aspects of the present disclosure.

FIG. 11 shows a diagram of a system 1100 including a device 1105 that supports physical downlink shared channel reference signal puncturing in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, a reference signal associated with the physical downlink shared channel, identify, for a set of time periods associated with the reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and process the reference signal in the subset of frequency resources based on the reference signal processing configuration.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting physical downlink shared channel reference signal puncturing).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
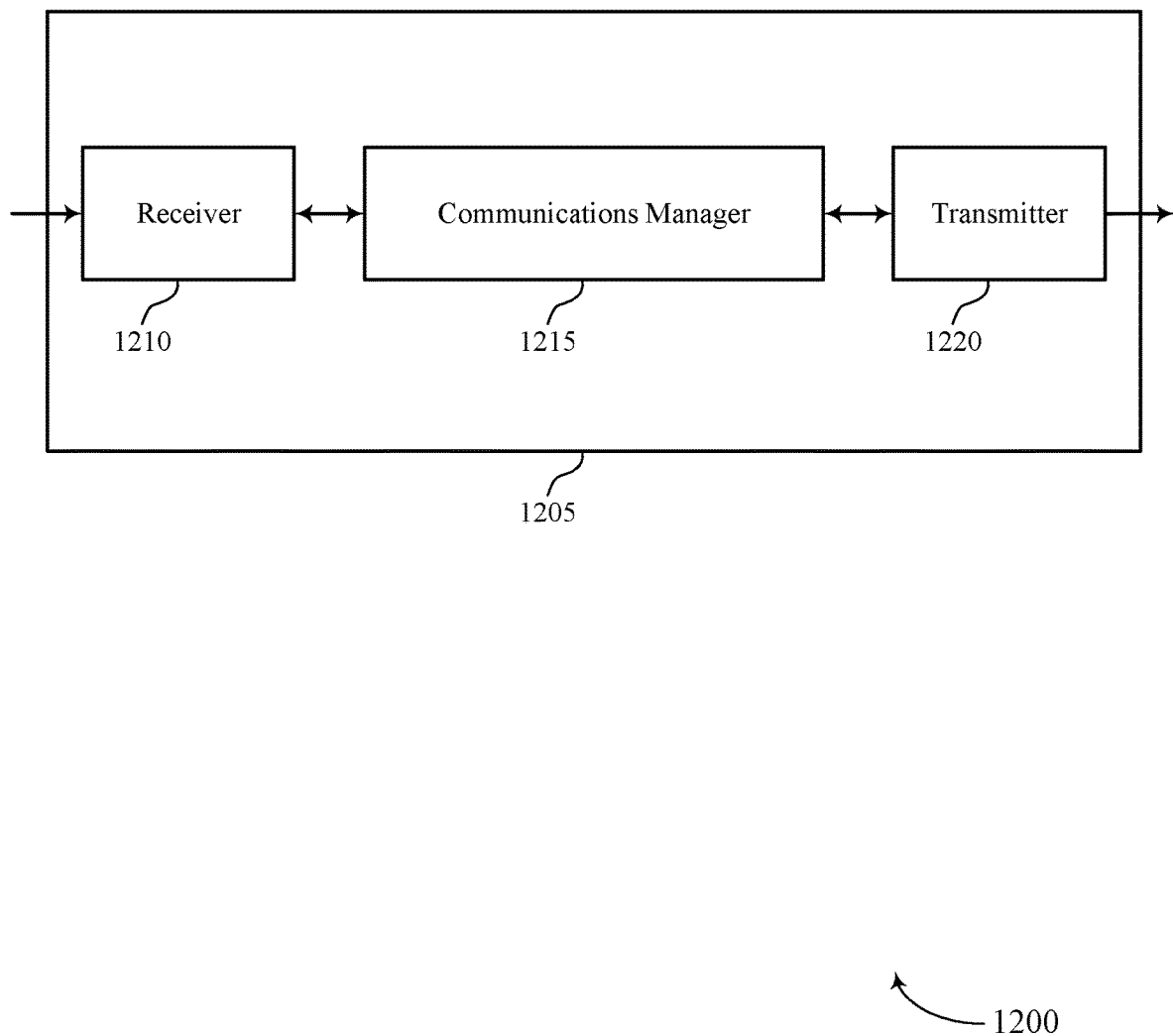
FIGS. 12 and 13 show block diagrams of devices that support physical downlink shared channel reference signal puncturing in accordance with aspects of the present disclosure.

FIG. 12 shows a block diagram 1200 of a device 1205 that supports physical downlink shared channel reference signal puncturing in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to physical downlink shared channel reference signal puncturing, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a reference signal associated with the physical downlink shared channel, identify, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and schedule the second set of frequency resources based on the reference signal processing configuration. The communications manager 1215 may be an example of aspects of the communications manager 1510 described herein. The actions performed by the communications manager 1215 as described herein may be implemented to realize one or more potential advantages. One implementation may allow a base station 105 to increase spectral efficiency by identifying an overlap between a first set of frequency resources allocated for the reference signal and a second set of frequency resources. Another implementation may provide improved quality and reliability of service at the base station 105, as latency may be reduced The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
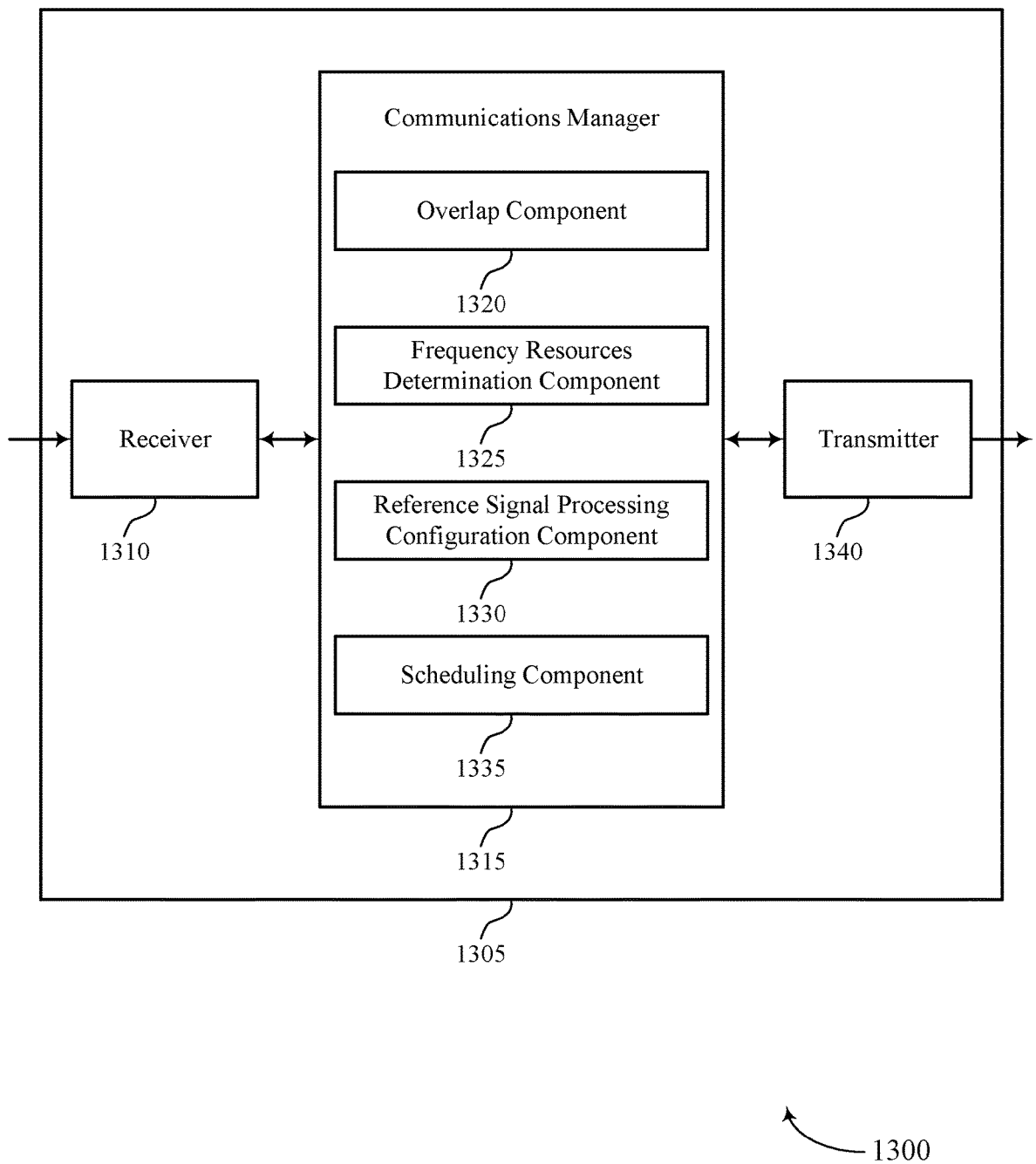

FIG. 13 shows a block diagram 1300 of a device 1305 that supports physical downlink shared channel reference signal puncturing in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to physical downlink shared channel reference signal puncturing, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an overlap component 1320, a frequency resources determination component 1325, a reference signal processing configuration component 1330, and a scheduling component 1335. The communications manager 1315 may be an example of aspects of the communications manager 1510 described herein.

The overlap component 1320 may transmit, to a UE, a reference signal associated with the physical downlink shared channel. The overlap component 1320 may identify, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel. The frequency resources determination component 1325 may determine a remaining set of frequency resources from the first set of frequency resources for each time period of the set of time periods based on the overlap. The reference signal processing configuration component 1330 may determine a subset of frequency resources from the remaining set of frequency resources for each time period of the set of time periods based on a reference signal processing configuration. The scheduling component 1335 may schedule the second set of frequency resources based on the reference signal processing configuration.

In some examples, based on identifying an overlap between a first set of frequency resources allocated for the reference signal and a second set of frequency resources that are scheduled to puncture the first set of resources and that are unavailable for scheduling on the physical downlink shared channel, a processor of a base station 105 (e.g., controlling the receiver 1310, the transmitter 1340, or the transceiver 1520 as described with reference to FIG. 15) may efficiently determine a remaining set of frequency resources from the first set of frequency resources for each time period of the set of time periods based on the overlap. Further, the processor of base station 105 may determine a subset of frequency resources from the remaining set of frequency resources for each time period of the set of time periods based on a reference signal processing configuration. The processor of the base station 105 may turn on one or more processing units for determining a subset of frequency resources, increase a processing clock, or a similar mechanism within the base station 105. As such, when the subset of frequency resources is determined, the processor may be ready to respond more efficiently through the reduction of a ramp up in processing power. The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
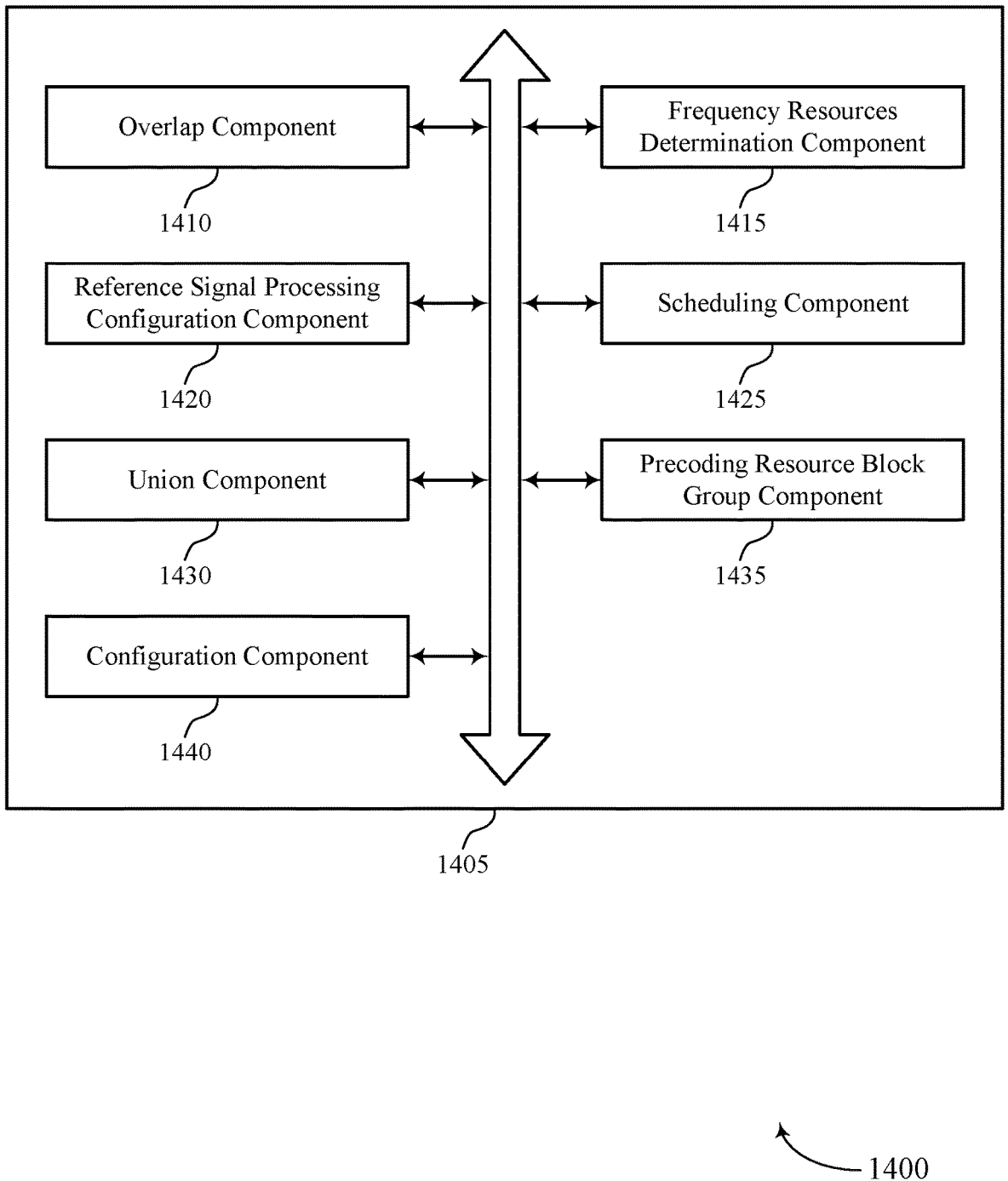
FIG. 14 shows a block diagram of a communications manager that supports physical downlink shared channel reference signal puncturing in accordance with aspects of the present disclosure.

FIG. 14 shows a block diagram 1400 of a communications manager 1405 that supports physical downlink shared channel reference signal puncturing in accordance with aspects of the present disclosure. The communications manager 1405 may be an example of aspects of a communications manager 1215, a communications manager 1315, or a communications manager 1510 described herein. The communications manager 1405 may include an overlap component 1410, a frequency resources determination component 1415, a reference signal processing configuration component 1420, a scheduling component 1425, an union component 1430, a precoding resource block group component 1435, and a configuration component 1440. Each of these modules may communicate, directly or indirectly, with one another (e.g., via one or more buses).

The overlap component 1410 may transmit, to a UE, a reference signal associated with the physical downlink shared channel. The overlap component 1410 may identify, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel. The frequency resources determination component 1415 may determine a remaining set of frequency resources from the first set of frequency resources for each time period of the set of time periods based on the overlap. The reference signal processing configuration component 1420 may determine a subset of frequency resources from the remaining set of frequency resources for each time period of the set of time periods based on a reference signal processing configuration. The scheduling component 1425 may schedule the second set of frequency resources based on the reference signal processing configuration. In some cases, the reference signal includes a demodulation reference signal. In some cases, the second set of frequency resources includes a synchronization signal block resource or a rate matching resource or both. In some cases, the set of time periods associated with the reference signal include a set of symbols.

In some examples, the reference signal processing configuration component 1420 may transmit, to a UE, a signal indicating the reference signal processing configuration. In some examples, the overlap component 1410 may identify, for a second set of time periods associated with the physical downlink shared channel, an overlap between a third set of frequency resources allocated for the physical downlink shared channel and the second set of frequency resources that are scheduled to puncture the third set of frequency resources. In some examples, the reference signal processing configuration component 1420 may determine, a second subset of frequency resources from the third set of frequency resources for each time period of the second set of time periods based on the overlap between the third set of frequency resources and the second set of frequency resources, where the second subset of frequency resources includes frequency resources remaining in the third set of frequency resources after rate matching around the second set of frequency resources.

In some examples, the frequency resources determination component 1415 may identify, from the remaining set of frequency resources, a largest common subset of frequency resources across all time periods of the set of time periods. The union component 1430 may identify a union of the second subset of frequency resources from the third set of frequency resources across all time periods of the set of time periods, where the reference signal processing configuration indicates that the largest common subset of frequency resources is sufficiently large to decode the physical downlink shared channel in the union of the second subset of frequency resources from the third set of frequency resources.

The precoding resource block group component 1435 may identify that a precoding resource block group size for the first set of frequency resources is configured as wideband. In some examples, the precoding resource block group component 1435 may transmit, to a UE, a radio resource control signal indicating that the precoding resource block group size is configured as a default size that is less than wideband. In some cases, a precoding resource block group size for the first set of frequency resources is configured as wideband or the physical downlink shared channel is configured with a first frequency domain resource allocation type, and where the second set of frequency resources includes resource element level rate matching resource.

In some cases, the reference signal processing configuration indicates that the subset of frequency resources includes a largest common subset of frequency resources across all time periods of the set of time periods. In some cases, a precoding resource block group size for the first set of frequency resources is configured as wideband or the physical downlink shared channel is configured with a first frequency domain resource allocation type and where the reference signal processing configuration indicates that the subset of frequency resources includes a number of frequency segments of contiguous resource blocks that is less than or equal to a threshold.

In some cases, the first set of frequency resources includes a first resource element in a set of resource elements associated with a time division orthogonal cover code or a frequency division orthogonal cover code, and where the second set of frequency resources includes a resource element level rate matching resource that overlaps with at least the first resource element in the set of resource elements.

The configuration component 1440 may configure phase continuity of the reference signal associated with the physical downlink shared channel for a bundle of time periods of the set of time periods associated with the reference signal. In some cases, the number of frequency segments is based on a largest common subset of frequency resources from the remaining set of frequency resources across all time periods of the set of time periods. In some cases, the number of frequency segments is based on the subset of frequency resources in each time period of the set of time periods.

In some cases, the reference signal processing configuration indicates that the subset of frequency resources is identical for each time period of the set of time periods. In some cases, the reference signal processing configuration indicates that a total number of frequency resources of the second set of frequency resources is less than or equal to a threshold. In some cases, the total number of frequency resources of the second set of frequency resources corresponds to any time period of the set of time periods.

In some cases, the reference signal processing configuration indicates that the set of time periods associated with the reference signal includes at least one of a set of time periods associated with the physical downlink shared channel in a slot, a set of time periods associated with multiple repetitions of the physical downlink shared channel in one or multiple slots scheduled by the same downlink control indicator, a set of time periods associated with multiple physical downlink shared channels scheduled by a multi-slot downlink control indicator, a set of time periods associated with multiple physical downlink shared channels in multiple slots semi-persistently scheduled and activated by the same downlink control indicator, or a combination thereof.

In some cases, the physical downlink shared channel includes a broadcast physical downlink shared channel or a unicast physical downlink shared channel. In some cases, the broadcast physical downlink shared channel is scheduled with at least one of a system information radio network temporary identifier, a random access radio network temporary identifier, a paging radio network temporary identifier, a temporary cell radio network temporary identifier, or a combination thereof. In some cases, the system information radio network temporary identifier includes a system information indicator in a downlink control indicator being set to a fixed value. In some cases, the unicast physical downlink shared channel is scheduled with at least one of a physical downlink control channel including a cyclic redundancy check scrambled by one or more identifiers. In some cases, the one or more identifiers include at least one of a cell radio network temporary identifier, a modulation coding scheme radio network temporary identifier, a configured scheduling radio network temporary identifier, a physical downlink shared channel with semi-persistent scheduling or a combination thereof.

Figure 15:
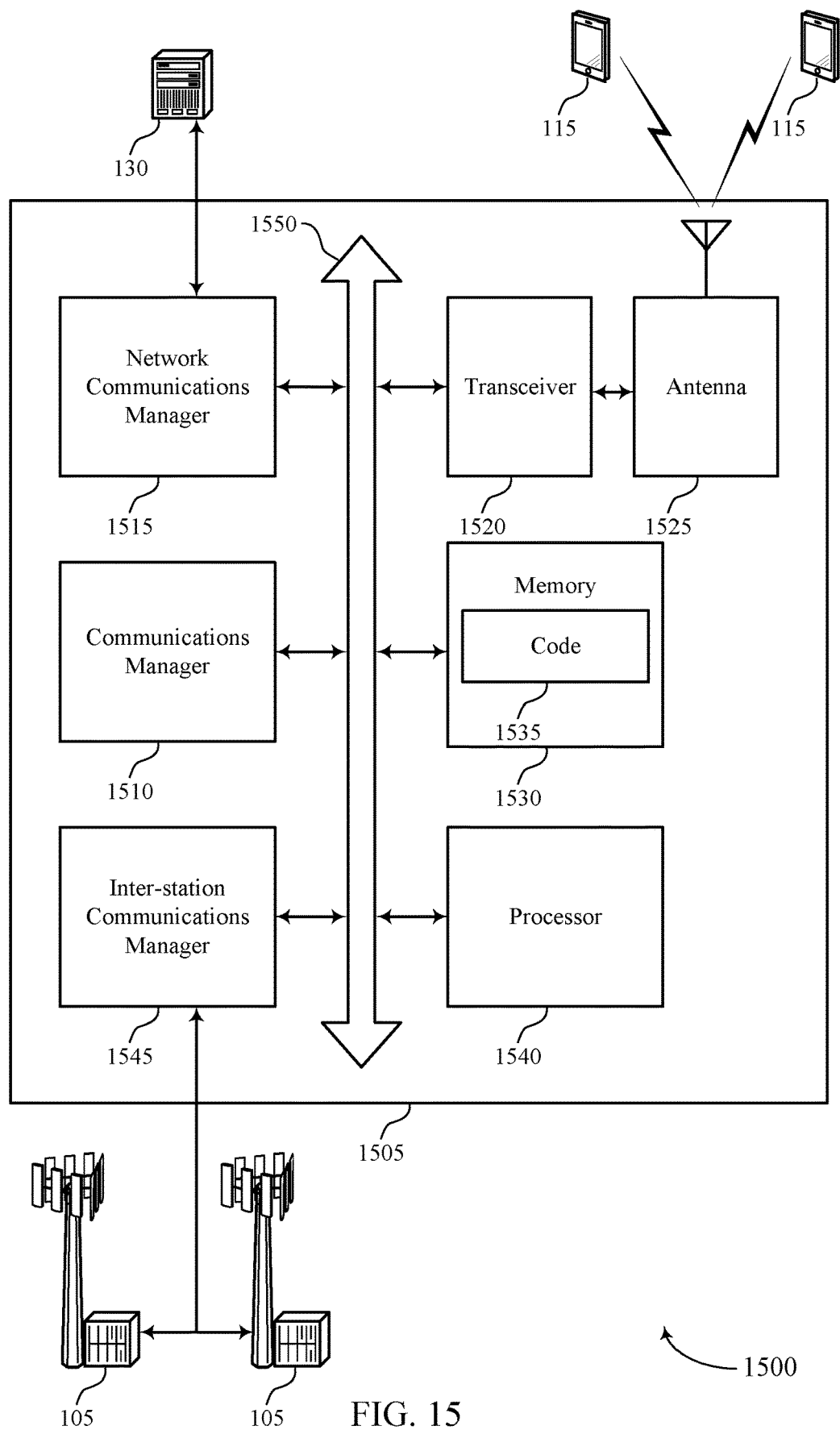
FIG. 15 shows a diagram of a system including a device that supports physical downlink shared channel reference signal puncturing in accordance with aspects of the present disclosure.

FIG. 15 shows a diagram of a system 1500 including a device 1505 that supports physical downlink shared channel reference signal puncturing in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a reference signal associated with the physical downlink shared channel, identify, for a set of time periods associated with the reference signal associated with a physical downlink shared channel, an overlap between a first set of frequency resources allocated for the reference signal and a second set of frequency resources for puncturing the first set of resources and that are unavailable for scheduling on the physical downlink shared channel, determine a remaining set of frequency resources from the first set of frequency resources for each time period of the set of time periods based on the overlap, determine a subset of frequency resources from the remaining set of frequency resources for each time period of the set of time periods based on a reference signal processing configuration, and schedule the second set of frequency resources based on the reference signal processing configuration.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases, the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting physical downlink shared channel reference signal puncturing).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
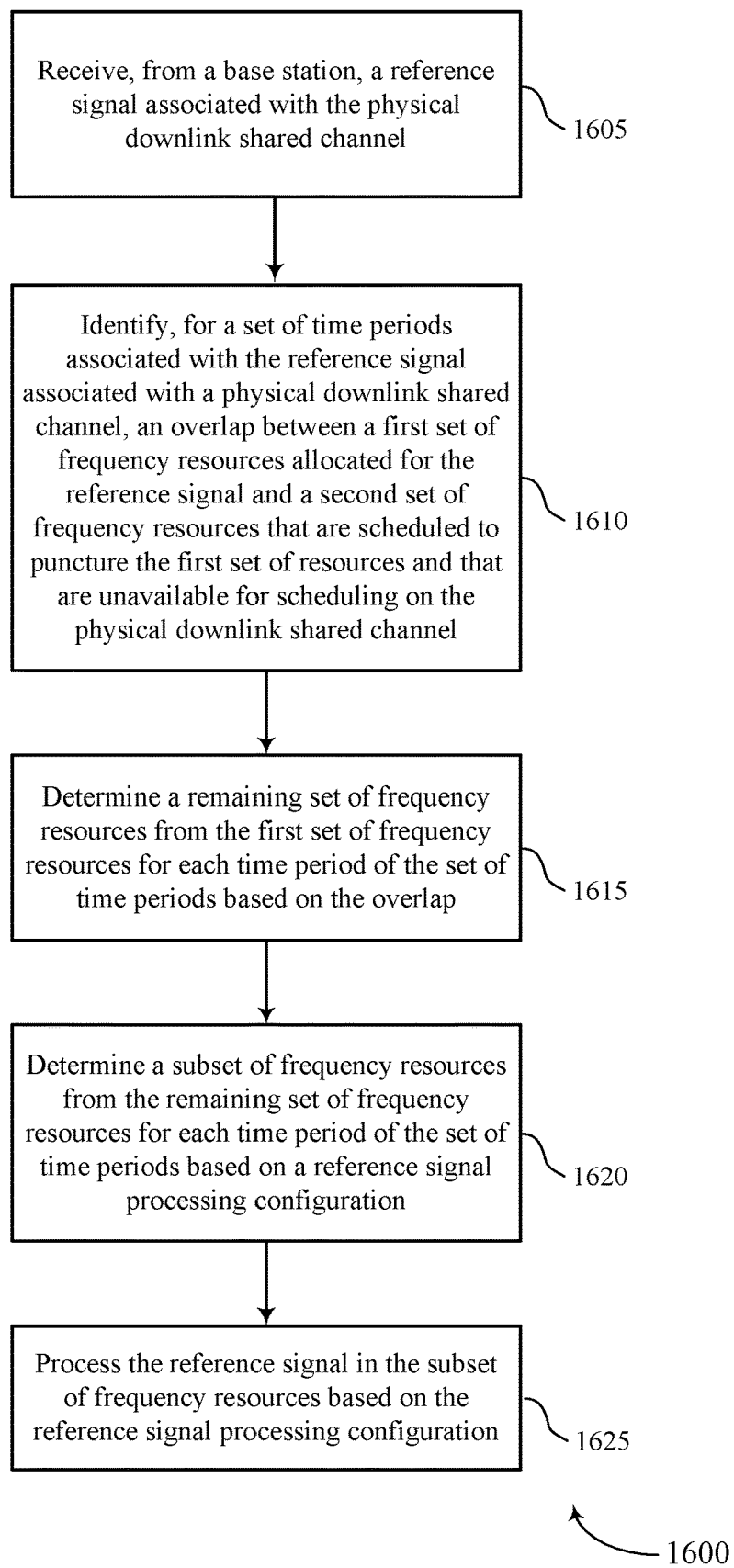
FIGS. 16 through 19 show flowcharts illustrating methods that support physical downlink shared channel reference signal puncturing in accordance with aspects of the present disclosure.

FIG. 16 shows a flowchart illustrating a method 1600 that supports physical downlink shared channel reference signal puncturing in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a reference signal associated with the physical downlink control channel. The operations of 1605 may be performed according to the methods described herein. In some examples, aspects of the operations of 1605 may be performed by an overlap component as described with reference to FIGS. 8 through 11.

At 1610, the UE may identify, for a set of time periods associated with a reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel. The operations of 1610 may be performed according to the methods described herein. In some examples, aspects of the operations of 1610 may be performed by an overlap component as described with reference to FIGS. 8 through 11.

At 1615, the UE may determine a remaining set of frequency resources from the first set of frequency resources for each time period of the set of time periods based on the overlap. The operations of 1615 may be performed according to the methods described herein. In some examples, aspects of the operations of 1615 may be performed by a frequency resources determination component as described with reference to FIGS. 8 through 11.

At 1620, the UE may determine a subset of frequency resources from the remaining set of frequency resources for each time period of the set of time periods based on a reference signal processing configuration. The operations of 1620 may be performed according to the methods described herein. In some examples, aspects of the operations of 1620 may be performed by a reference signal processing configuration component as described with reference to FIGS. 8 through 11.

At 1625, the UE may process the reference signal in the subset of frequency resources based on the reference signal processing configuration. The operations of 1625 may be performed according to the methods described herein. In some examples, aspects of the operations of 1625 may be performed by a reference signal processing component as described with reference to FIGS. 8 through 11.

Figure 17:
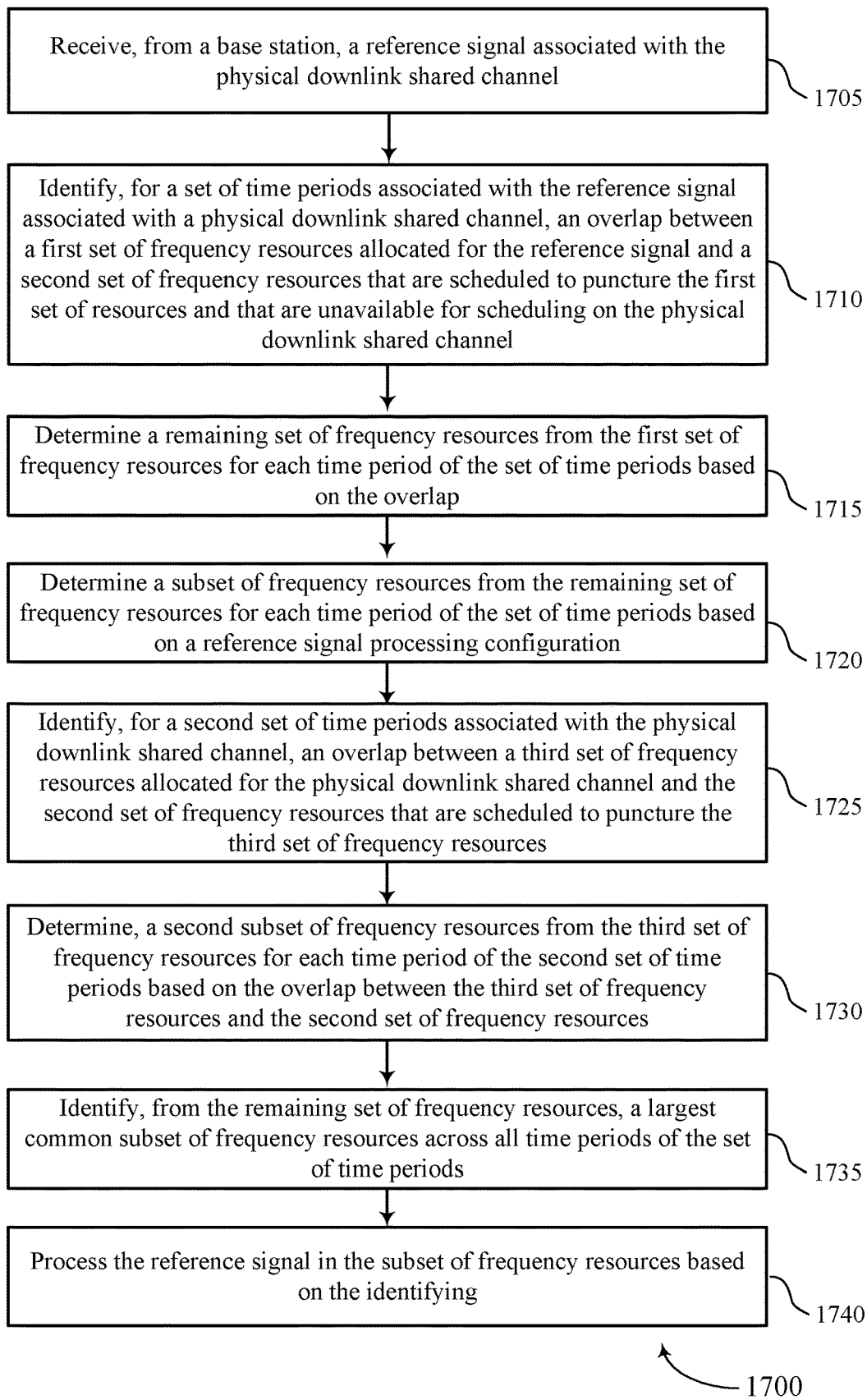

FIG. 17 shows a flowchart illustrating a method 1700 that supports physical downlink shared channel reference signal puncturing in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, a reference signal associated with the physical downlink control channel. The operations of 1705 may be performed according to the methods described herein. In some examples, aspects of the operations of 1705 may be performed by an overlap component as described with reference to FIGS. 8 through 11.

At 1710, the UE may identify, for a set of time periods associated with a reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel. The operations of 1710 may be performed according to the methods described herein. In some examples, aspects of the operations of 1710 may be performed by an overlap component as described with reference to FIGS. 8 through 11.

At 1715, the UE may determine a remaining set of frequency resources from the first set of frequency resources for each time period of the set of time periods based on the overlap. The operations of 1715 may be performed according to the methods described herein. In some examples, aspects of the operations of 1715 may be performed by a frequency resources determination component as described with reference to FIGS. 8 through 11.

At 1720, the UE may determine a subset of frequency resources from the remaining set of frequency resources for each time period of the set of time periods based on a reference signal processing configuration. The operations of 1720 may be performed according to the methods described herein. In some examples, aspects of the operations of 1720 may be performed by a reference signal processing configuration component as described with reference to FIGS. 8 through 11.

At 1725, the UE may identify, for a second set of time periods associated with the physical downlink shared channel, an overlap between a third set of frequency resources allocated for the physical downlink shared channel and the second set of frequency resources that are scheduled to puncture the third set of frequency resources. The operations of 1725 may be performed according to the methods described herein. In some examples, aspects of the operations of 1725 may be performed by an overlap component as described with reference to FIGS. 8 through 11.

At 1730, the UE may determine, a second subset of frequency resources from the third set of frequency resources for each time period of the second set of time periods based on the overlap between the third set of frequency resources and the second set of frequency resources, where the second subset of frequency resources includes frequency resources remaining in the third set of frequency resources after rate matching around the second set of frequency resources. The operations of 1730 may be performed according to the methods described herein. In some examples, aspects of the operations of 1730 may be performed by a frequency resources determination component as described with reference to FIGS. 8 through 11.

At 1735, the UE may identify, from the remaining set of frequency resources, a largest common subset of frequency resources across all time periods of the set of time periods. The operations of 1735 may be performed according to the methods described herein. In some examples, aspects of the operations of 1735 may be performed by a frequency resources determination component as described with reference to FIGS. 8 through 11.

At 1740, the UE may process the reference signal in the subset of frequency resources based on the identifying. The operations of 1740 may be performed according to the methods described herein. In some examples, aspects of the operations of 1740 may be performed by a reference signal processing component as described with reference to FIGS. 8 through 11.

Figure 18:
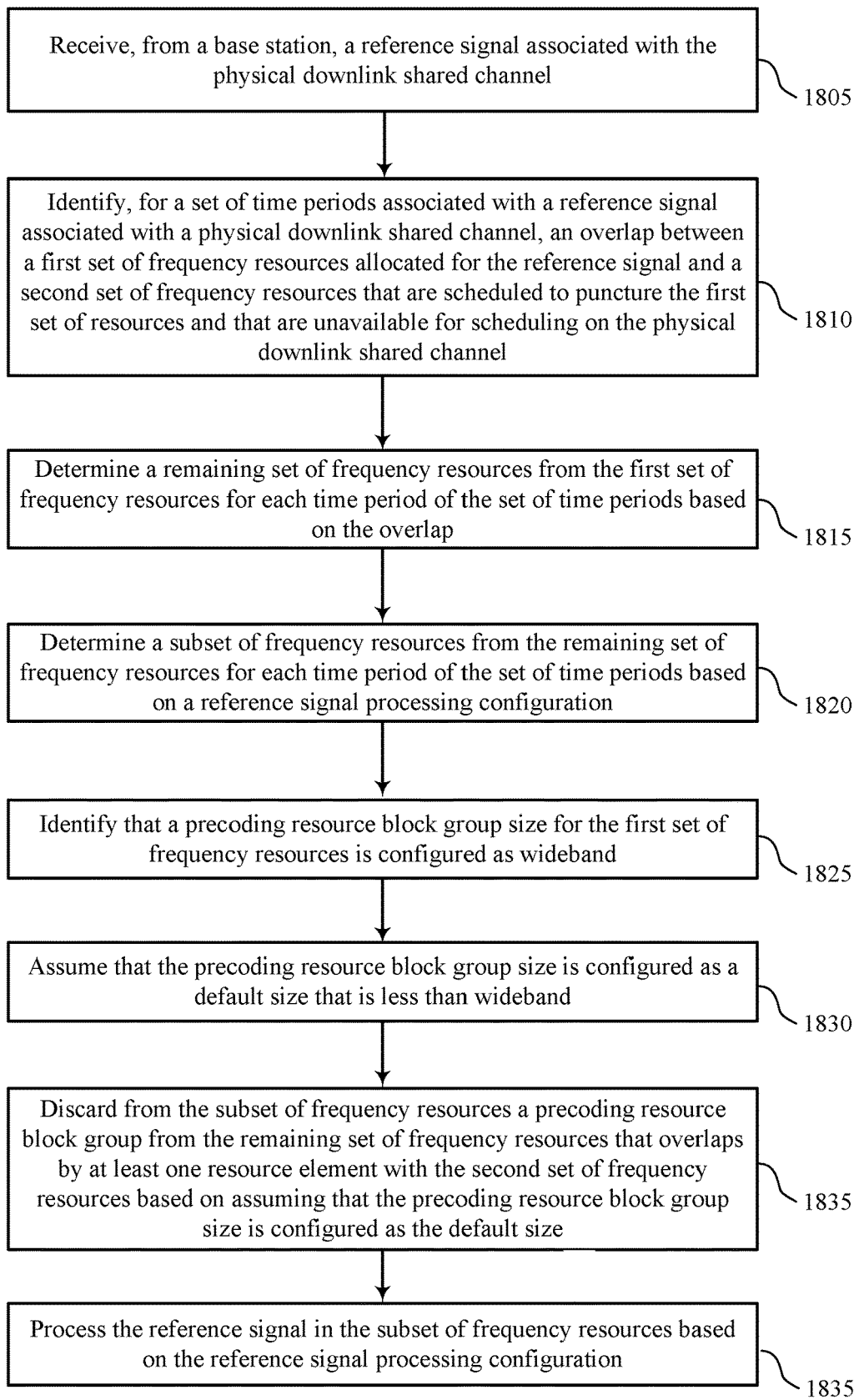

FIG. 18 shows a flowchart illustrating a method 1800 that supports physical downlink shared channel reference signal puncturing in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a base station, a reference signal associated with the physical downlink control channel. The operations of 1805 may be performed according to the methods described herein. In some examples, aspects of the operations of 1805 may be performed by an overlap component as described with reference to FIGS. 8 through 11.

At 1810, the UE may identify, for a set of time periods associated with a reference signal associated with a physical downlink shared channel, an overlap between a first set of frequency resources allocated for the reference signal and a second set of frequency resources that are scheduled to puncture the first set of resources and that are unavailable for scheduling on the physical downlink shared channel. The operations of 1810 may be performed according to the methods described herein. In some examples, aspects of the operations of 1810 may be performed by an overlap component as described with reference to FIGS. 8 through 11.

At 1815, the UE may determine a remaining set of frequency resources from the first set of frequency resources for each time period of the set of time periods based on the overlap. The operations of 1815 may be performed according to the methods described herein. In some examples, aspects of the operations of 1815 may be performed by a frequency resources determination component as described with reference to FIGS. 8 through 11.

At 1820, the UE may determine a subset of frequency resources from the remaining set of frequency resources for each time period of the set of time periods based on a reference signal processing configuration. The operations of 1820 may be performed according to the methods described herein. In some examples, aspects of the operations of 1820 may be performed by a reference signal processing configuration component as described with reference to FIGS. 8 through 11.

At 1825, the UE may identify that a precoding resource block group size for the first set of frequency resources is configured as wideband. The operations of 1825 may be performed according to the methods described herein. In some examples, aspects of the operations of 1825 may be performed by a precoding resource block group component as described with reference to FIGS. 8 through 11.

At 1830, the UE may assume that the precoding resource block group size is configured as a default size that is less than wideband. The operations of 1830 may be performed according to the methods described herein. In some examples, aspects of the operations of 1830 may be performed by a precoding resource block group component as described with reference to FIGS. 8 through 11.

At 1835, the UE may discard from the subset of frequency resources a precoding resource block group from the remaining set of frequency resources that overlaps by at least one resource element with the second set of frequency resources based on assuming that the precoding resource block group size is configured as the default size. The operations of 1835 may be performed according to the methods described herein. In some examples, aspects of the operations of 1835 may be performed by a discarding component as described with reference to FIGS. 8 through 11.

At 1840, the UE may process the reference signal in the subset of frequency resources based on the reference signal processing configuration. The operations of 1840 may be performed according to the methods described herein. In some examples, aspects of the operations of 1840 may be performed by a reference signal processing component as described with reference to FIGS. 8 through 11.

Figure 19:
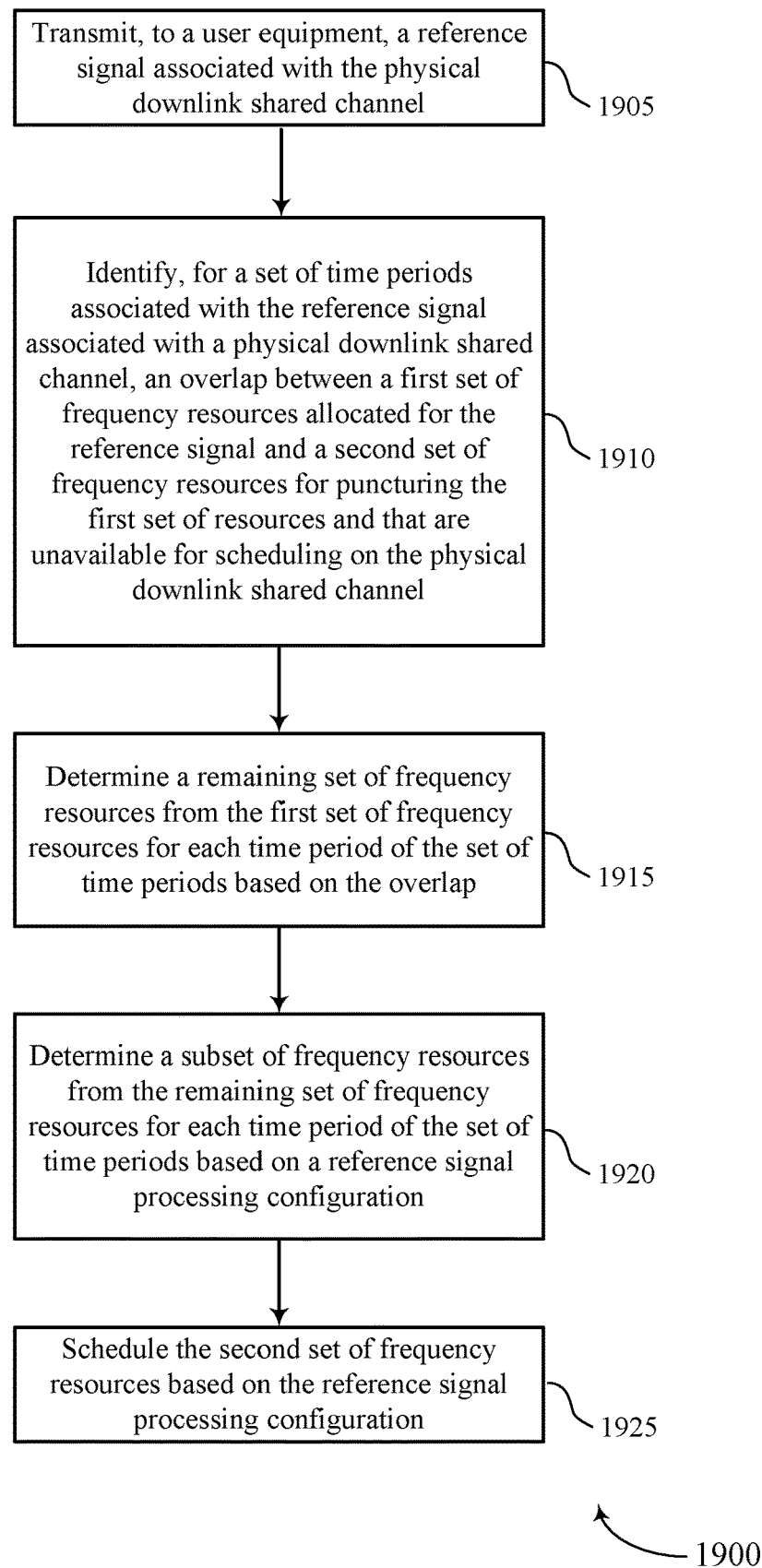

FIG. 19 shows a flowchart illustrating a method 1900 that supports physical downlink shared channel reference signal puncturing in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, a reference signal associated with the physical downlink shared channel.

At 1910, the base station may identify, for a set of time periods associated with a reference signal associated with a physical downlink shared channel, an overlap between a first set of frequency resources allocated for the reference signal and a second set of frequency resources for puncturing the first set of resources and that are unavailable for scheduling on the physical downlink shared channel. The operations of 1910 may be performed according to the methods described herein. In some examples, aspects of the operations of 1910 may be performed by an overlap component as described with reference to FIGS. 12 through 15.

At 1915, the base station may determine a remaining set of frequency resources from the first set of frequency resources for each time period of the set of time periods based on the overlap. The operations of 1915 may be performed according to the methods described herein. In some examples, aspects of the operations of 1915 may be performed by a frequency resources determination component as described with reference to FIGS. 12 through 15.

At 1920, the base station may determine a subset of frequency resources from the remaining set of frequency resources for each time period of the set of time periods based on a reference signal processing configuration. The operations of 1920 may be performed according to the methods described herein. In some examples, aspects of the operations of 1920 may be performed by a reference signal processing configuration component as described with reference to FIGS. 12 through 15.

At 1925, the base station may schedule the second set of frequency resources based on the reference signal processing configuration. The operations of 1925 may be performed according to the methods described herein. In some examples, aspects of the operations of 1925 may be performed by a scheduling component as described with reference to FIGS. 12 through 15.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:

receiving, from a network device, a reference signal associated with a physical downlink shared channel;

identifying, for a set of time periods associated with the reference signal associated with the physical downlink shared channel, an overlap between a first set of frequency resources allocated for the reference signal and a second set of frequency resources that are scheduled to puncture the first set of frequency resources and that are unavailable for scheduling on the physical downlink shared channel;

determining a remaining set of frequency resources from the first set of frequency resources for each time period of the set of time periods based at least in part on the overlap;
  determining a subset of frequency resources from the remaining set of frequency resources for each time period of the set of time periods based at least in part on a reference signal processing configuration, wherein the reference signal processing configuration indicates that the subset of frequency resources comprises a largest common subset of frequency resources across all time periods of the set of time periods; and
  processing the reference signal in the subset of frequency resources based at least in part on the reference signal processing configuration.

2. The method of claim 1, wherein the reference signal processing configuration indicates that the subset of frequency resources is identical for each time period of the set of time periods.

3. The method of claim 1, further comprising:
  identifying, for a second set of time periods associated with the physical downlink shared channel, an overlap between a third set of frequency resources allocated for the physical downlink shared channel and the second set of frequency resources that are scheduled to puncture the third set of frequency resources; and
  determining, a second subset of frequency resources from the third set of frequency resources for each time period of the second set of time periods based at least in part on the overlap between the third set of frequency resources and the second set of frequency resources, wherein the second subset of frequency resources comprises frequency resources remaining in the third set of frequency resources after rate matching around the second set of frequency resources.

4. The method of claim 3, further comprising:
  identifying, from the remaining set of frequency resources, a largest common subset of frequency resources across all time periods of the set of time periods; and
  identifying a union of the second subset of frequency resources from the third set of frequency resources across all time periods of the set of time periods, wherein the reference signal processing configuration indicates that the largest common subset of frequency resources is sufficiently large to decode the physical downlink shared channel in the union of the second subset of frequency resources from the third set of frequency resources.

5. The method of claim 1, wherein determining the subset of frequency resources from the remaining set of frequency resources comprises:
  discarding, from the subset of frequency resources, a resource element from the remaining set of frequency resources that overlaps with the second set of frequency resources.

6. The method of claim 1, wherein determining the subset of frequency resources from the remaining set of frequency resources comprises:
  discarding, from the subset of frequency resources, a resource block from the remaining set of frequency resources that overlaps by at least one resource element with the second set of frequency resources.

7. The method of claim 1, wherein determining the subset of frequency resources from the remaining set of frequency resources comprises:
  including, in the subset of frequency resources, a resource block from the remaining set of frequency resources that contains at least one resource element that does not overlap by any resource element with the second set of frequency resources.

8. The method of claim 1, wherein determining the subset of frequency resources from the remaining set of frequency resources comprises:
  discarding, from the subset of frequency resources, a precoding resource block group from the remaining set of frequency resources that overlaps by at least one resource element with the second set of frequency resources.

9. The method of claim 1, wherein determining the subset of frequency resources from the remaining set of frequency resources comprises:
  identifying that a precoding resource block group size for the first set of frequency resources is configured as wideband;
  assuming that the precoding resource block group size is configured as a default size that is less than wideband;
  discarding from the subset of frequency resources a precoding resource block group from the remaining set of frequency resources that overlaps by at least one resource element with the second set of frequency resources based at least in part on assuming that the precoding resource block group size is configured as the default size; and
  assuming that the precoding resource block group size is configured as the default size based at least in part on at least one of a radio resource control signal received from the network device, a capability associated with the user equipment, or a combination thereof.

10. The method of claim 1, wherein a precoding resource block group size for the first set of frequency resources is configured as wideband or the physical downlink shared channel is configured with a first frequency domain resource allocation type, and wherein the second set of frequency resources comprises resource element level rate matching resource, and wherein determining the subset of frequency resources from the remaining set of frequency resources further comprises:
  discarding, from the subset of frequency resources, a resource block from the remaining set of frequency resources having a resource element that overlaps with the resource element level rate matching resource.

11. The method of claim 1, wherein the first set of frequency resources comprises a first resource element in a set of resource elements associated with a time division orthogonal cover code or a frequency division orthogonal cover code, wherein the second set of frequency resources comprises a resource element level rate matching resource that overlaps with at least the first resource element in the set of resource elements, and wherein determining the subset of frequency resources from the remaining set of frequency resources further comprises:
  discarding, from the subset of frequency resources, the set of resource elements.

12. The method of claim 1, wherein a precoding resource block group size for the first set of frequency resources is configured as wideband or the physical downlink shared channel is configured with a first frequency domain resource allocation type and wherein the reference signal processing configuration indicates that the subset of frequency resources comprises a number of frequency segments of contiguous resource blocks that is less than or equal to a threshold.

13. The method of claim 12, wherein the number of frequency segments is based at least in part on a largest common subset of frequency resources from the remaining set of frequency resources across all time periods of the set of time periods, or wherein the number of frequency segments is based at least in part on the subset of frequency resources in each time period of the set of time periods.

14. The method of claim 1, wherein the reference signal processing configuration indicates that a total number of frequency resources of the second set of frequency resources is less than or equal to a threshold.

15. The method of claim 14, wherein the total number of frequency resources of the second set of frequency resources corresponds to any time period of the set of time periods.

16. The method of claim 14, further comprising:
identifying that a first time period of the set of time periods and a second time period of the set of time periods are associated with a time division orthogonal cover code; and
identifying, in the first time period and the second time period, a distinct number of frequency resources that are scheduled to puncture the first set of frequency resources allocated for the reference signal, wherein the total number of frequency resources of the second set of frequency resources is based at least in part on the distinct number of frequency resources.

17. The method of claim 14, further comprising:
identifying, in the set of time periods, a distinct number of frequency resources that are scheduled to puncture the first set of frequency resources allocated for the reference signal, wherein the total number of frequency resources of the second set of frequency resources is based at least in part on the distinct number of frequency resources.

18. The method of claim 1, wherein the reference signal processing configuration indicates that the set of time periods associated with the reference signal comprises at least one of a set of time periods associated with the physical downlink shared channel in a slot, a set of time periods associated with multiple repetitions of the physical downlink shared channel in one or multiple slots scheduled by a same downlink control indicator, a set of time periods associated with multiple physical downlink shared channels scheduled by a multi-slot downlink control indicator, a set of time periods associated with multiple physical downlink shared channels in multiple slots semi-persistently scheduled and activated by the same downlink control indicator, or a combination thereof.

19. The method of claim 1, wherein:
phase continuity of the reference signal associated with the physical downlink shared channel is configured for a bundle of time periods of the set of time periods associated with the reference signal.

20. The method of claim 19, wherein determining the subset of frequency resources from the remaining set of frequency resources further comprises:
identifying a punctured time period in the set of time periods and a subset of time periods remaining in the set of time periods after the punctured time period; and
bundling the subset of time periods based at least in part on the reference signal processing configuration, wherein the reference signal processing configuration indicates that bundling is disabled in the punctured time period.

21. The method of claim 19, wherein determining the subset of frequency resources from the remaining set of frequency resources further comprises:
identifying a punctured time period in the set of time periods; and
refraining from bundling the set of time periods based at least in part on the reference signal processing configuration.

22. The method of claim 1, wherein the physical downlink shared channel comprises a broadcast physical downlink shared channel or a unicast physical downlink shared channel.

23. The method of claim 22, wherein the broadcast physical downlink shared channel is scheduled with at least one of a system information radio network temporary identifier, a random access radio network temporary identifier, a paging radio network temporary identifier, a temporary cell radio network temporary identifier, or a combination thereof, and wherein the system information radio network temporary identifier comprises a system information indicator in a downlink control indicator being set to a fixed value.

24. The method of claim 22, wherein the unicast physical downlink shared channel is scheduled with at least one of a physical downlink control channel including a cyclic redundancy check scrambled by one or more identifiers, and wherein the one or more identifiers comprise at least one of a cell radio network temporary identifier, a modulation coding scheme radio network temporary identifier, a configured scheduling radio network temporary identifier, a physical downlink shared channel with semi-persistent scheduling or a combination thereof.

25. The method of claim 1, further comprising:
receiving, from the network device, a signal indicating the reference signal processing configuration.

26. The method of claim 1, wherein the second set of frequency resources comprises a synchronization signal block resource or a rate matching resource or both, and wherein the reference signal comprises a demodulation reference signal.

27. A method for wireless communication at a network device, comprising:
transmitting, to a user equipment, a reference signal associated with a physical downlink shared channel;
identifying, for a set of time periods associated with the reference signal associated with the physical downlink shared channel, an overlap between a first set of frequency resources allocated for the reference signal and a second set of frequency resources for puncturing the first set of frequency resources and that are unavailable for scheduling on the physical downlink shared channel;
determining a remaining set of frequency resources from the first set of frequency resources for each time period of the set of time periods based at least in part on the overlap;
determining a subset of frequency resources from the remaining set of frequency resources for each time period of the set of time periods based at least in part on a reference signal processing configuration, wherein the reference signal processing configuration indicates that the subset of frequency resources comprises a largest common subset of frequency resources across all time periods of the set of time periods; and
scheduling the second set of frequency resources based at least in part on the reference signal processing configuration.

28. An apparatus for wireless communication at a user equipment, comprising:
a processor, memory coupled to the processor; and
instructions stored in the memory and executable by the processor to cause the apparatus to:
- receive, from a network device, a reference signal associated with a physical downlink shared channel;
- identify, for a set of time periods associated with a reference signal associated with a physical downlink shared channel, an overlap between a first set of frequency resources allocated for the reference signal and a second set of frequency resources that are scheduled to puncture the first set of frequency resources and that are unavailable for scheduling on the physical downlink shared channel;
- determine a remaining set of frequency resources from the first set of frequency resources for each time period of the set of time periods based at least in part on the overlap;
- determine a subset of frequency resources from the remaining set of frequency resources for each time period of the set of time periods based at least in part on a reference signal processing configuration, wherein the reference signal processing configuration indicates that the subset of frequency resources comprises a largest common subset of frequency resources across all time periods of the set of time periods; and
- process the reference signal in the subset of frequency resources based at least in part on the reference signal processing configuration.

29. An apparatus for wireless communication at a network device, comprising:
a processor,
memory coupled to the processor; and
instructions stored in the memory and executable by the processor to cause the apparatus to:
- transmit, to a user equipment, a reference signal associated with a physical downlink shared channel;
- identify, for a set of time periods associated with a reference signal associated with a physical downlink shared channel, an overlap between a first set of frequency resources allocated for the reference signal and a second set of frequency resources for puncturing the first set of frequency resources and that are unavailable for scheduling on the physical downlink shared channel;
- determine a remaining set of frequency resources from the first set of frequency resources for each time period of the set of time periods based at least in part on the overlap;
- determine a subset of frequency resources from the remaining set of frequency resources for each time period of the set of time periods based at least in part on a reference signal processing configuration, wherein the reference signal processing configuration indicates that the subset of frequency resources comprises a largest common subset of frequency resources across all time periods of the set of time periods; and
- schedule the second set of frequency resources based at least in part on the reference signal processing configuration.

* * * * *